United States Patent
Ota et al.

(10) Patent No.: US 9,386,508 B2
(45) Date of Patent: Jul. 5, 2016

(54) INFORMATION PROVIDING SYSTEM, INFORMATION PROVIDING APPARATUS AND INFORMATION PROVIDING METHOD

(71) Applicant: YAHOO JAPAN CORPORATION, Tokyo (JP)

(72) Inventors: Hiroshi Ota, Tokyo (JP); Yasuhiro Sukemitsu, Tokyo (JP); Taku Kusano, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 144 days.

(21) Appl. No.: 14/154,539

(22) Filed: Jan. 14, 2014

(65) Prior Publication Data
US 2014/0204926 A1  Jul. 24, 2014

(30) Foreign Application Priority Data
Jan. 23, 2013 (JP) .................. 2013-010637

(51) Int. Cl.
| | |
|---|---|
| *H04W 48/08* | (2009.01) |
| *H04W 48/16* | (2009.01) |
| *H04W 84/12* | (2009.01) |
| *H04W 4/02* | (2009.01) |
| *H04W 68/04* | (2009.01) |
| *H04W 68/06* | (2009.01) |
| *H04W 68/08* | (2009.01) |
| *H04W 68/12* | (2009.01) |

(52) U.S. Cl.
CPC .............. *H04W 48/08* (2013.01); *H04W 48/16* (2013.01); *H04W 84/12* (2013.01)

(58) Field of Classification Search
CPC ..... H04W 48/08; H04W 48/18; H04W 48/20; H04W 84/12
USPC ................. 370/338; 455/456.1, 456.2, 456.3, 455/456.5, 41.2
See application file for complete search history.

(56) References Cited

U.S. PATENT DOCUMENTS 8,494,559 B1 * 7/2013 Malmi ........................ 455/456.3
2005/0090262 A1 * 4/2005 Hamano et al. ............... 455/445
(Continued)

FOREIGN PATENT DOCUMENTS

| JP | A-2005-107897 | 4/2005 |
|---|---|---|
| JP | 2011-217225 A | 10/2011 |

(Continued)

OTHER PUBLICATIONS

Jun. 2, 2015 Office Action issued in Japanese Application No. 2014-155881.
(Continued)

*Primary Examiner* — Un C Cho
*Assistant Examiner* — Peian Lou
(74) *Attorney, Agent, or Firm* — Oliff PLC

(57) ABSTRACT

The information providing system according to the embodiment includes a wireless LAN access point and an information providing apparatus. The wireless LAN access point detects a wireless terminal existing in a wireless LAN communication area to transmit the detection information to the information providing apparatus. The information providing apparatus determines either the wireless LAN access point or a wireless WAN base station, on the basis of information on a user of a wireless terminal specified according to the detection information and/or the information on an installation location of the wireless LAN access point, as a communication medium that notifies the notification information.

13 Claims, 10 Drawing Sheets

(56) References Cited

U.S. PATENT DOCUMENTS

| | | | |
|---|---|---|---|
| 2009/0156208 A1* | 6/2009 | Vesterinen et al. | 455/435.1 |
| 2009/0247162 A1* | 10/2009 | Yasuoka et al. | 455/436 |
| 2010/0190449 A1* | 7/2010 | Suzuki | H04W 4/02 455/67.11 |
| 2012/0188876 A1* | 7/2012 | Chow et al. | 370/237 |
| 2013/0137423 A1* | 5/2013 | Das et al. | 455/426.1 |
| 2013/0267224 A1* | 10/2013 | Krishnaswamy et al. | 455/426.1 |

FOREIGN PATENT DOCUMENTS

| | | |
|---|---|---|
| JP | A-2012-010241 | 1/2012 |
| JP | A-2012-142883 | 7/2012 |
| JP | 2012-231236 A | 11/2012 |
| JP | A-2012-222432 | 11/2012 |
| WO | WO 2004/023741 A1 | 3/2004 |

OTHER PUBLICATIONS

3GPP TS 23.402, "3rd Generation Partnership Project; Technical Specification Group Services and System Apects; Architecture enhancements for non-3GPP access (Release 11)," 3GPP Organizational Partners, V11.5.0, p. 19, Dec. 18, 2015.

Apr. 8, 2014 Office Action issued in Japanese Application No. 2013-010637 (with translation).

\* cited by examiner

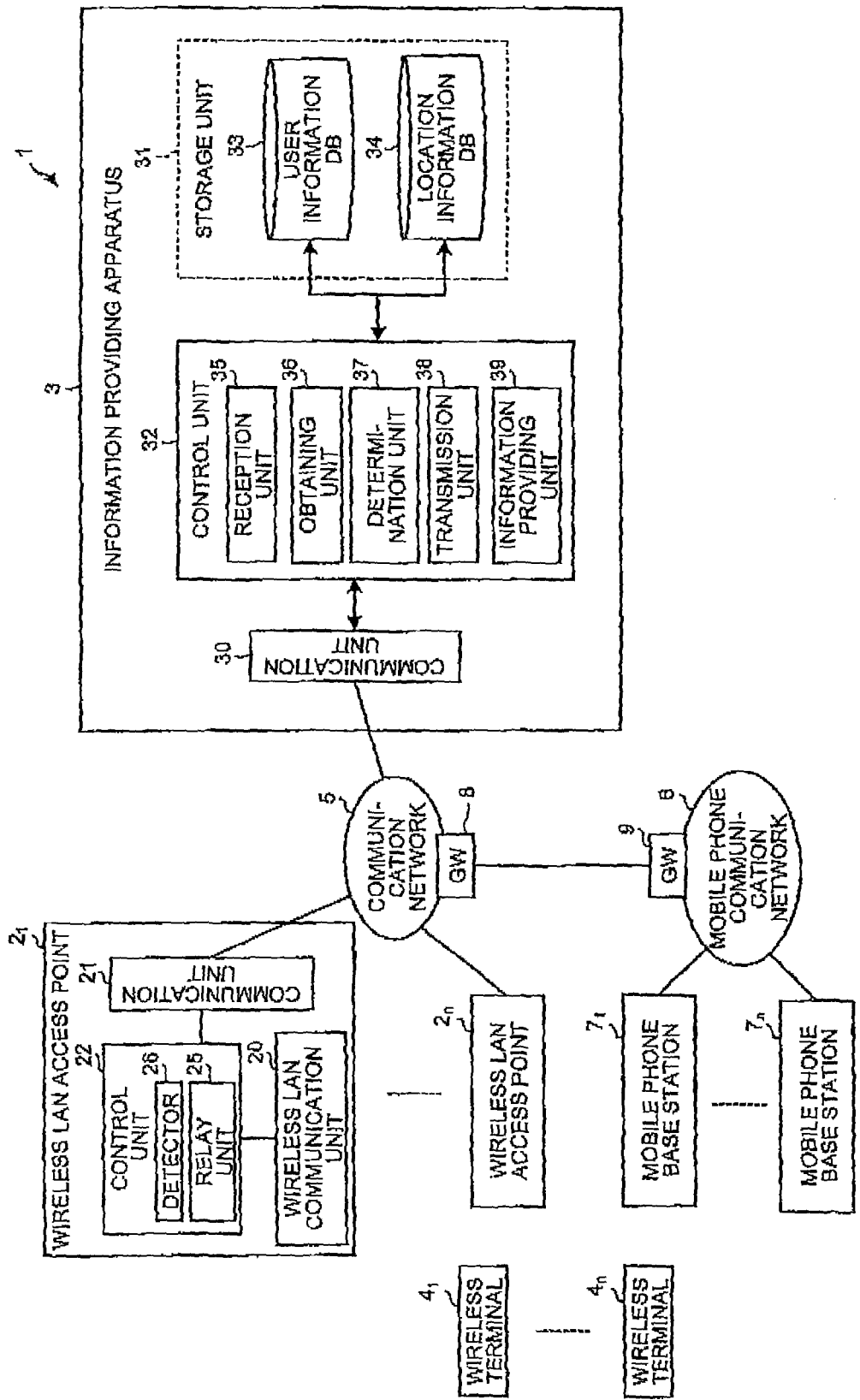

FIG.4

| AP-ID | TERMINAL ID | CHECK-IN TIME | CHECK-OUT TIME | RADIO WAVE INTENSITY |
|---|---|---|---|---|
| A1 | T1 | 2/1/2013 12:28:50 | — | 10 |
| | T2 | 2/1/2013 12:21:34 | — | 2 |
| | T3 | 2/1/2013 12:13:56 | — | 1 |
| | T4 | 2/1/2013 12:39:08 | — | 5 |
| | ⋮ | ⋮ | ⋮ | ⋮ |
| A2 | T7 | 2/1/2013 12:33:15 | — | 3 |
| | T8 | 2/1/2013 12:38:53 | — | 7 |
| | ⋮ | ⋮ | ⋮ | ⋮ |
| ⋮ | ⋮ | ⋮ | ⋮ | ⋮ |

FIG.5

| LOCATION ID | AP-ID | LOCATION NAME | NOTIFICATION INFORMATION (VIA LAN) | NOTIFICATION INFORMATION (VIA WAN) | LOCATION ATTRIBUTE ID |
|---|---|---|---|---|---|
| G1 | A1 | XX RAILWAY ROPPONGI STATION | noticeA11.data | noticeA21.data | Z1 |
| G2 | A2 | XX RAILWAY TRAIN | noticeA12.data | noticeA22.data | Z2 |
| G3 | A3 | IN FRONT OF THE HACHIKO DAG STATUE | noticeA13.data | noticeA23.data | Z3 |
| G4 | A4 | XX LAND | noticeA14.data | noticeA24.data | Z4 |
| G5 | A5 | XX'S CAR | noticeA15.data | noticeA25.data | Z5 |
| G6 | A6 | XX SCHOOL | noticeA16.data | noticeA26.data | Z6 |
| ⋮ | ⋮ | ⋮ | ⋮ | ⋮ | ⋮ |

FIG.6

| LOCATION ATTRIBUTE ID | LOCATION ATTRIBUTE NAME | COMMUNICATION MEDIUM SELECTING CONDITION |
|---|---|---|
| Z1 | PUBLIC TRANSPORTATION (STATION) | FIRST COMMUNICATION MEDIUM SELECTION TABLE<br>TERMINAL MOVEMENT ATTRIBUTE CONDITION:5, 20<br>AP MOVEMENT ATTRIBUTE CONDITION:30 |
| Z2 | PUBLIC TRANSPORTATION (TRAIN) | FIRST COMMUNICATION MEDIUM SELECTION TABLE<br>TERMINAL MOVEMENT ATTRIBUTE CONDITION:4, 10<br>AP MOVEMENT ATTRIBUTE CONDITION:10 |
| Z3 | MEETING SPOT | FIRST COMMUNICATION MEDIUM SELECTION TABLE<br>TERMINAL MOVEMENT ATTRIBUTE CONDITION:2, 40<br>AP MOVEMENT ATTRIBUTE CONDITION:20 |
| Z4 | LEISURE COMPLEX | FIRST COMMUNICATION MEDIUM SELECTION TABLE<br>TERMINAL MOVEMENT ATTRIBUTE CONDITION:3, 15<br>AP MOVEMENT ATTRIBUTE CONDITION:10 |
| Z5 | CAR MOUNTED | SECOND COMMUNICATION MEDIUM SELECTION TABLE |
| Z6 | SCHOOL | SECOND COMMUNICATION MEDIUM SELECTION TABLE |
| ⋮ | ⋮ | ⋮ |

FIG.7

| TERMINAL ID | TERMINAL MOVING ATTRIBUTE | AP MOVING ATTRIBUTE |
|---|---|---|
| T1 | MOVING | IDENTIFICATION |
| T2 | STOP | IDENTIFICATION |
| T3 | MOVING | MOVING |
| T4 | STOP | MOVING |
| ⋮ | ⋮ | ⋮ |

FIG.8

| USER ID | TER-MINAL ID | WAN -ID | USER ATTRIBUTE ||||||
|---|---|---|---|---|---|---|---|---|
| | | | DEMOGRAPHIC ATTRIBUTE ||||| PHYCHOGRAPHIC ATTRIBUTE ||
| | | | SEX | AGE | OCCUPATION | CAR | ... | PERSONAL COMPUTER | CAKE | ... |
| U1 | T1 | W1 | MALE | 25 | STUDENT OF XX SCHOOL | — | ... | 1 | 0 | ... |
| U2 | T2 | W2 | FE-MALE | 29 | FEMALE OFFICE WORKER | DRIVER OF XX'S CAR | ... | 0 | 0 | ... |
| ⋮ | ⋮ | ⋮ | ⋮ | ⋮ | ⋮ | ⋮ | ⋮ | ⋮ | ⋮ | ⋮ |

FIG.9A

|  | AP MOVING ATTRIBUTE | |
|---|---|---|
|  | MOVING | IDENTIFICATION |
| TERMINAL MOVING ATTRIBUTE — MOVING | WAN | LAN |
| TERMINAL MOVING ATTRIBUTE — STOP | WAN/LAN | LAN |

FIG.9B

| WAN | LAN |
|---|---|
| DRIVER | PERSON OTHER THAN DRIVER |
| PERSON OTHER THAN STUDENT OR TEACHER | STUDENT OR TEACHER |

FIG.10
| TER-MINAL ID | COMMUNICATION SUBSCRIPTION CONDITION | USED PACKET AMOUNT | WAN NOTIFICATION UPPER LIMIT |
|---|---|---|---|
| T1 | 400,000 PACKETS/MONTH | 400,000 PACKETS | 300,000 PACKETS/MONTH |
| T2 | A MILLION PACKETS/MONTH | 550,000 PACKETS | 800,000 PACKETS/MONTH |
| ⋮ | ⋮ | ⋮ | ⋮ |
FIG.11A
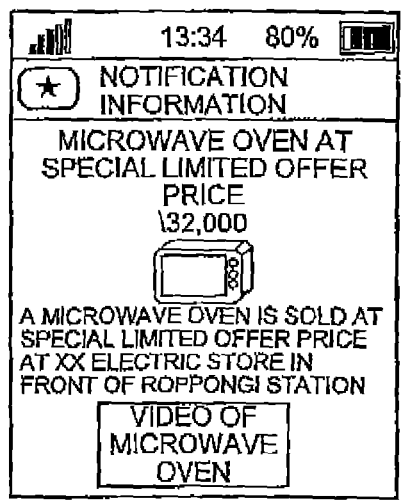
FIG.11B
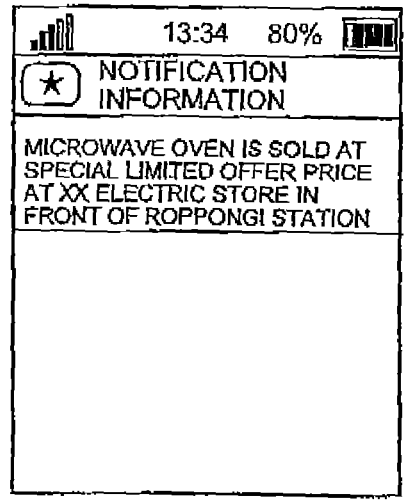

INFORMATION PROVIDING SYSTEM, INFORMATION PROVIDING APPARATUS AND INFORMATION PROVIDING METHOD

CROSS-REFERENCE TO RELATED APPLICATIONS

The present application claims priority to and incorporates by reference the entire contents of Japanese Patent Application No. 2013-010637 filed in Japan on Jan. 23, 2013.

BACKGROUND OF THE INVENTION

1. Field of the Invention

The present invention relates to an information providing system, an information providing apparatus, and an information providing method.

2. Description of the Related Art

In recent years, there has been a rapid proliferation of local area network (LAN) communications. Wireless LAN access points are installed at various locations such as a station, an airport, and a store. A wireless LAN communication function has become standard equipment on various mobile devices such as a personal computer, a mobile phone, and a portable game console. Proliferation of such public wireless LAN communications is forecast to further increase. The user of a mobile device that is a wireless terminal is forecast to be able to use a high-speed Internet connection at more various locations.

For example, Japanese Patent Application Laid-open No. 2005-107897 describes a technique to notify the contents corresponding to an access point from an information distribution control apparatus to a wireless terminal by e-mail in a communication environment when it is detected that the wireless terminal exists in the access point.

However, in the technique of Japanese Patent Application Laid-open No. 2005-107897, the information is not appropriately notified to the user of the wireless terminal sometimes because, for example, the state of the user of the wireless terminal or the state of the installation location of the wireless LAN access point is not considered.

SUMMARY OF THE INVENTION

According to an exemplary embodiment, an information providing system includes a wireless LAN access point and an information providing apparatus. The information providing apparatus manages information corresponding to the wireless LAN access point. The wireless LAN access point includes a detection unit and a detection information transmission unit. The detection unit detects a wireless terminal existing in a communication area of the wireless LAN access point. The detection information transmission unit transmits detection information including information on the wireless terminal detected by the detection unit to the information providing apparatus. The information providing apparatus includes an information storage unit, a reception unit, an obtaining unit, a determination unit, and a notification unit. The information storage unit stores notification information corresponding to the wireless LAN access point. The reception unit receives the detection information transmitted from the wireless LAN access point. The obtaining unit obtains information on a user of a wireless terminal specified according to the detection information and/or information on the installation location of the wireless LAN access point. The determination unit determines either the wireless LAN access point or a wireless WAN base station, on the basis of the information obtained by the obtaining unit, as a communication medium to notify the notification information. The notification unit notifies the notification information stored in the information storage unit via the communication medium determined by the determination unit to the wireless terminal specified according to the detection information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram of an exemplary specific configuration of the information providing system according to the embodiment;

FIG. 4 is a diagram of an example of data about terminal existence stored in a location information DB;

FIG. 5 is a diagram of an exemplary location information table stored in the location information DB;

FIG. 6 is a diagram of an exemplary location attribute information table stored in the location information DB;

FIG. 7 is a diagram of an exemplary terminal state information table stored in the location information DB;

FIG. 8 is a diagram of an exemplary user information table stored in a user information DB;

FIG. 9A is a diagram of an exemplary first communication medium selection table stored in the location information DB;

FIG. 9B is a diagram of an exemplary second communication medium selection table stored in the location information DB;

FIG. 10 is a diagram of an exemplary communication subscription table stored in the user information DB;

FIGS. 11A and 11B are each a diagram of an exemplary screen of the notification information to be notified to a wireless terminal;

DETAILED DESCRIPTION OF THE PREFERRED EMBODIMENTS

Hereinafter, an embodiment of an information providing system, an information providing apparatus, and an information providing method according to the present application will be described in detail with reference to the appended drawings. Note that the information providing system, information providing apparatus, method for providing information according to the present application is not limited to the embodiment.

1. Information Providing System

Figure 1A:
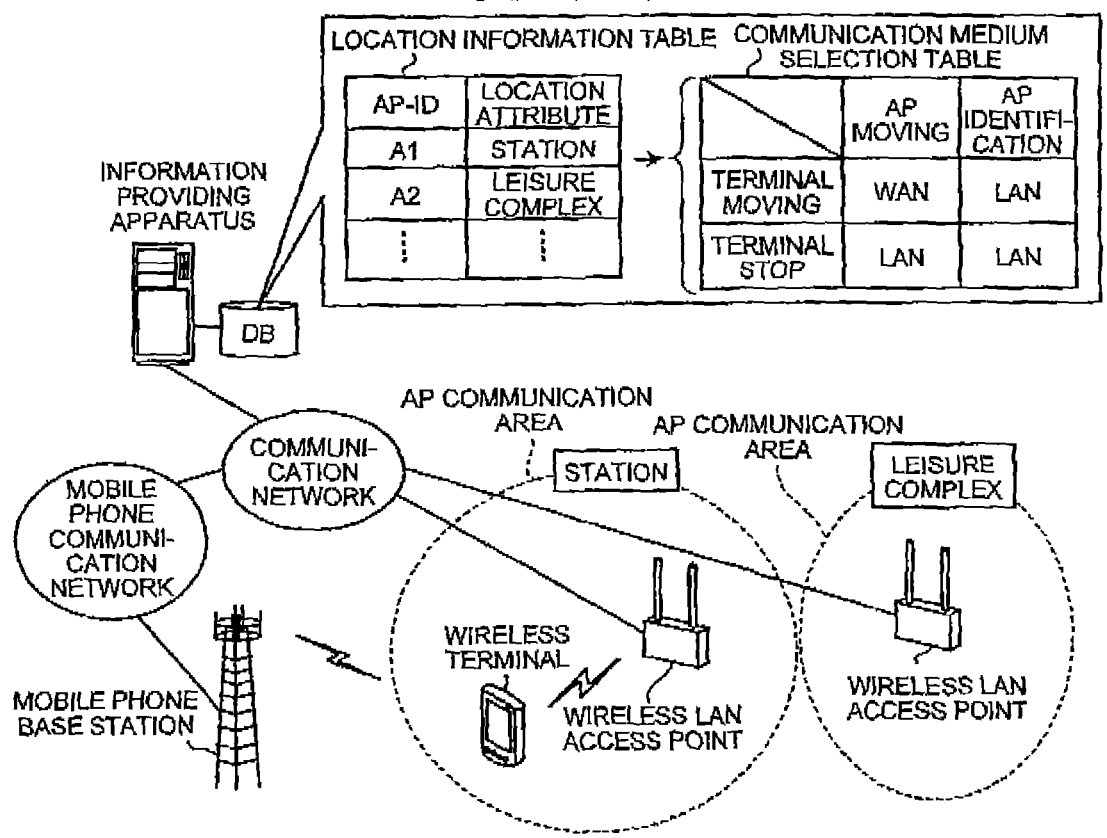
FIG. 1A is a diagram of the configuration of an information providing system according to an embodiment.

First, the information providing system according to the embodiment will be described. FIG. 1A is a diagram of the configuration of the information providing system according to the embodiment.

As illustrated in FIG. 1A, the information providing system according to the embodiment includes a plurality of wireless local area network (LAN) access points, and an information providing apparatus. The information providing apparatus can communicate with the wireless LAN access points via a communication network. Further, the information providing apparatus can communicate with a wireless terminal that is a mobile phone via a wireless LAN access point or a mobile phone communication network. The communication network is an Internet protocol (IP) network, for example, an Internet.

The mobile phone communication network is a wide area network (WAN) and is connected to the communication network via a gateway server (not illustrated in the drawings). The wireless terminal can access a server (for example, a website) connected to the communication network via a mobile phone base station (corresponding to an exemplary wireless WAN base station). The wireless terminal is a mobile phone on which a wireless LAN communication function is stalled, and can also access a server via a wireless LAN access point in the communication area of the wireless LAN access point.

Each of the wireless LAN access points includes a wireless LAN communication unit so as to perform a wireless communication with a wireless terminal using the wireless LAN communication unit. The wireless LAN access point covers a commercial space as the communication area, for example, a store, a restaurant, a hair salon, a barber shop, a hospital, a hotel, a theater, or a leisure complex in addition to a station, a mall, or an event site where a concert or a sports activity is held.

The information providing apparatus includes a database (hereinafter, referred to as DB) that stores notification information so as to select and obtain the notification information corresponding to the wireless LAN access point in which the wireless terminal exists from the notification information stored in the DB and transmit the notification information to the wireless terminal.

Thus, the wireless terminal can obtain the notification information corresponding to each of the wireless LAN access points. On the assumption that a wireless LAN access point is installed at a restaurant, the user of the wireless terminal can obtain, for example, the information on the restaurant by entering the communication area of the wireless LAN access point.

The information providing apparatus selects one of a wireless LAN access point or a mobile phone base station as the communication medium on the basis of the information on the user of the wireless terminal or the information on the installation location of the wireless LAN access point so as to transmit the notification information to the wireless terminal from the selected communication medium. Thus, the user of the wireless terminal can receive the notification information via an appropriate communication route.

The information on the user of the wireless terminal (hereinafter, sometimes referred to as a terminal user) is, for example, the moving state of the terminal user or the attribute of the terminal user. For example, when the terminal user stops, the information providing apparatus transmits the notification information from the wireless LAN access point. When the terminal user moves between the wireless LAN access points, the information providing apparatus transmits the notification information from the mobile phone base station.

The information providing apparatus determines whether the terminal user stops or moves, for example, according to the radio field intensity of the wireless terminal detected with the wireless LAN access point. Such a determination is performed on a criterion according to the installation location of the wireless LAN access point (hereinafter, sometimes referred to as an AP installation location).

2. Method for Providing Information

Figure 1B:
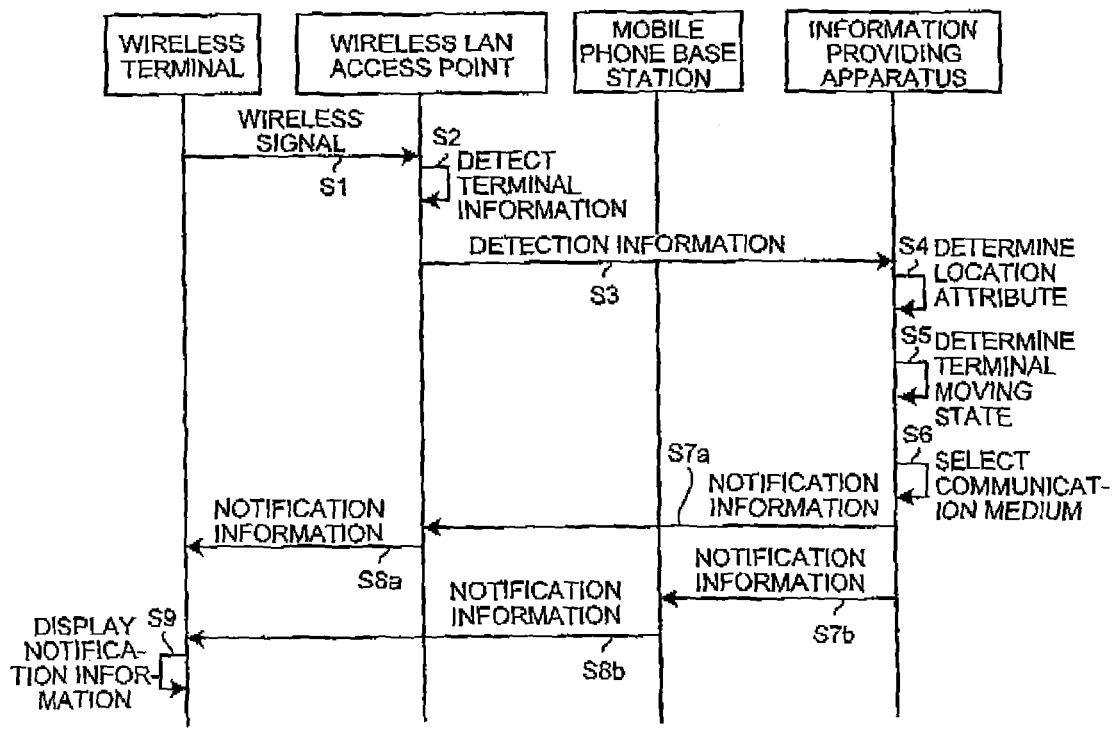
FIG. 1B is an explanatory diagram of an information providing process performed in the information providing system illustrated in FIG. 1A.

Next, an exemplary method for providing information with the information providing system will be described. FIG. 1B is an explanatory diagram of an information providing method according to the embodiment.

As illustrated in FIG. 1B, a wireless terminal existing in an AP communication area transmits a wireless signal to the wireless LAN access point (step S1). The wireless LAN access point detects the terminal ID or radio field intensity information of the wireless terminal as the terminal information on the basis of the wireless signal transmitted from the wireless terminal (step S2).

The terminal ID is, for example, the media access control (MAC) address of the wireless LAN communication unit in a wireless terminal. The radio field intensity information is, for example, the information on the radio field intensity of the wireless signal transmitted from the wireless terminal and received at the wireless LAN access point. The wireless LAN access point transmits the information including the terminal information and the AP-ID as the detection information to the information providing apparatus (step S3). The AP-ID is the identification data of the wireless LAN access point.

The information providing apparatus determines the location attribute of the wireless LAN access point on the basis of the detection information transmitted from the wireless LAN access point (step 34). The information providing apparatus stores the location information table that links the AP-ID and the location attribute so as to obtain the location attribute corresponding to the AP-ID included in the detection information from the location information table. The information providing apparatus obtains, for example, the location attribute "station" corresponding to the AP-ID "A1" from the location information table illustrated in FIG. 1A and then determines that the wireless LAN access point includes a "station" as the location attribute.

Next, the information providing apparatus determines the moving state of the wireless terminal on the basis of the detection information transmitted from the wireless LAN access point and the location attribute of the wireless LAN access point (step S5). For example, when the wireless LAN access point includes a "station" as the location attribute, the information providing apparatus determines the moving state of the wireless terminal on the basis of the determination criterion value and determination criterion time corresponding to the "station".

When the variation of the radio field intensity of the wireless terminal is equal to or higher than the criterion value, the information providing apparatus determines that the wireless terminal moves. When the variation of the radio field intensity of the wireless terminal is lower than the criterion value, the information providing apparatus determines that the wireless terminal stops. The information providing apparatus also determines whether the wireless terminal has been in the same wireless LAN access point since before the criterion time or has moved among a plurality of wireless LAN access points since before the criterion time.

Next, the information providing apparatus selects one of the wireless LAN access point and the mobile phone base station as the communication medium on the basis of the moving state of the wireless terminal (step S6). For example, when the moving state of the wireless terminal is in a rest or is in a moving in a wireless LAN access point, the information providing apparatus selects the wireless LAN access point as the communication medium. For example, when the moving state of the wireless terminal is a moving among a plurality of wireless LAN access points, the information providing apparatus selects the mobile phone base station as the communication medium.

After selecting the wireless LAN access point as the communication medium, the information providing apparatus transmits the notification information to the communication network (step S7a) so as to cause the wireless LAN access point to notify the notification information to the wireless terminal (step S8a). On the other hand, when selecting the mobile phone base station as the communication medium, the information providing apparatus transmits the notification information intended for the wireless terminal from the communication network to the mobile phone communication network (step S7b) so as to cause the mobile phone base station to notify the notification information to the wireless terminal (step S8b).

When receiving the notification information from the wireless LAN access point or the mobile phone base station, the wireless terminal displays the notification information on the display unit (step S9). The notification information displayed as described above corresponds to the wireless LAN access point that has detected the wireless terminal. In the example illustrated in FIG. 1A, the information on the "station" from the wireless LAN access point installed at the "station" is displayed as the notification information on the display unit of the wireless terminal.

As described above, when a wireless terminal enters the communication area of a wireless LAN access point, the notification information corresponding to the wireless LAN access point is notified to the wireless terminal in the information providing system according to the embodiment.

Accordingly, when the wireless LAN access point is installed, for example, at a store, the information on the store can be notified to the user who has entered the store. This enables an efficient notification of the information on the store to the user. This also prevents a notification of the information having nothing to do with the store that the user has entered to the user and thus does not bring a feeling of discomfort to the user.

Further, the information providing system according to the embodiment can notify appropriate notification information via a different communication route to the wireless terminal on the basis of the information on the user of the wireless terminal or the information on the installation location of the wireless LAN access point.

For example, when staying an AP installation location for a given length of time or more, the terminal user is often interested in the AP installation location. Thus, the information providing apparatus notifies the detailed information to the wireless terminal. The detailed information includes, for example, the digital contents about the AP installation location or the information on the product sold at the AP installation location. The detailed information relatively has a large amount of information. Using a wireless LAN access point having a relatively high communication rate can transmit the notification information to the wireless terminal at high speed. This can notify the notification information to the wireless terminal at the right time.

On the other hand, when merely passing through an AP installation location, the terminal user is often not interested in the AP installation location so much. Thus, the information providing apparatus notifies brief information to the wireless terminal. The brief information includes, for example, the information on the stores around the AP installation location and how crowded the stores are. The brief information relatively has a small amount of information. Even a mobile phone base station having a relatively low communication rate can transmit the notification information to the wireless terminal at high speed. This can notify the notification information to the wireless terminal at the right time. After the terminal user has passed through the AP installation location, the notification information can be notified to the wireless terminal.

Note that the communication route can be selected on the basis of only the information on the terminal user, or the communication route can be selected on the basis of only the AP installation location. Hereinafter, the specific configuration and specific process in the information providing system will be described with reference to the drawings.

3. Specific Configuration of the Information Providing System

The specific configuration of the information providing system according to the embodiment will be described using FIG. 2. FIG. 2 is a diagram of an exemplary specific configuration of the information providing system according to the embodiment.

As illustrated in FIG. 2, an information providing system 1 includes a plurality of wireless LAN access points $2_1$ to $2_n$, and an information providing apparatus 3 so as to provide various types of information to wireless terminals $4_1$ to $4_n$. Each of the wireless terminals $4_1$ to $4_n$ is a mobile phone having a wireless LAN communication function, for example, a smartphone and is owned by each user. Note that, when it is not necessary to distinguish the wireless terminals $4_1$ to $4_n$, the wireless terminals $4_1$ to $4_n$ are generically called a "wireless terminal 4".

The wireless LAN access points $2_1$ to $2_n$ and the information providing apparatus 3 are managed, for example, by an information provider. Note that, when it is not necessary to distinguish the wireless LAN access points $2_1$ to $2_n$, the wireless LAN access points $2_1$ to $2_n$ are generically called a "wireless LAN access point 2".

The wireless LAN access point 2 is connected to the information providing apparatus 3 via a communication network 5 such that the information providing apparatus 3 can provide various types of information from the wireless LAN access point 2 to the wireless terminal 4 via the communication network 5. Although the communication network 5 will be described as the Internet in the present embodiment, the communication network 5 is not limited to the Internet. For example, the communication network 5 can be a dedicated network for an information provider.

A mobile phone communication network 6 is connected to the communication network 5 through gateway servers 8 and 9 such that the information providing apparatus 3 can also transmits the information from mobile phone base stations $7_1$ to $7_n$ connected to the mobile phone communication network 6 via the communication network 5 to the wireless terminal 4. Note that, when it is not necessary to distinguish the mobile phone base stations $7_1$ to $7_n$, the mobile phone base stations $7_1$ to $7_n$ are generically called a "mobile phone base station 7".

Although the mobile phone communication network 6 has been described above as an exemplary communication network to which a wireless WAN base station is connected, the communication network to which a wireless WAN base station is connected is not limited to the mobile phone communication network 6. For example, the communication network to which the wireless WAN base station is connected can be a private data communication network. In that case, the wireless WAN base station is a wireless base station in a private data communication network so that the information is transmitted from the wireless base station to the wireless terminal 4.

The wireless terminal 4 has a function for displaying notification information on the display unit so as to obtain and display the notification information provided from the information providing system 1 via the communication network 5. Note that the function for displaying notification information is included, for example, in the Operating System (OS) or application of the wireless terminal 4.

The wireless terminal 4 includes a browser so as to display the information on the page provided from the information providing system 1 or a website (not illustrated in the drawings). For example, when the communication network 5 is the Internet, the page provided from the information providing system 1 is a web page specified with a markup language, for example, the HyperText Markup Language (HTML).

Hereinafter, the specific configurations of the wireless LAN access point 2 and the information providing apparatus 3 will be described in sequence.

4. Configuration of Wireless LAN Access Point 2

First, the configuration of the wireless LAN access point 2 will specifically be described. As illustrated in FIG. 2, the wireless LAN access point 2 includes a wireless LAN communication unit 20, a communication unit 21, and a control unit 22.

The wireless LAN communication unit 20 is installed such that a region including a location to be notified is the communication area. The wireless LAN communication unit 20 is a communication interface that performs a wireless LAN communication. The wireless LAN communication unit 20 transmits and receives the information with the wireless terminal 4 including a wireless LAN communication function using a wireless signal. Note that examples of the wireless LAN include a wireless LAN specified in IEEE 802.11, but are not limited to the wireless LAN based on such a standard.

The communication unit 21 is connected to the communication network 5 so as to transmit and receive the information with a device on the communication network side via the communication network 5. The communication unit 21 has a wired or wireless connection to the communication network 5. The device on the communication network side is, for example, the information providing apparatus 3 and a Web server (not illustrated in the drawings).

The control unit 22 includes a relay unit 25 configured to perform a data relay process, and a detector 26 configured to perform a process for detecting the wireless terminal 4 so as to implement or perform a function or behavior of the information process to be described below. Note that the internal configuration of the control unit 22 is not limited to the configuration described above, and can be another configuration that performs the information process to be described below.

The relay unit 25 transmits, for example, the information obtained from the wireless terminal 4 through the wireless LAN communication unit 20 from the communication unit 21 to the device on the communication network side, and transmits the information obtained from the device on the communication network side through the communication unit 21 from the wireless LAN communication unit 20 to the wireless terminal 4.

Note that the information transmission from the wireless LAN access point 2 to the device on the communication network side is performed, for example, in a packet communication in which the address of the communication network 5 allocated to the wireless LAN access point 2 is the source address and the address of the communication network 5 allocated to the device on the communication network side is the destination address. The address of the communication network 5 is, for example, the address allocated to the communication unit 21 that is, for example, an IP address.

Figure 3A:
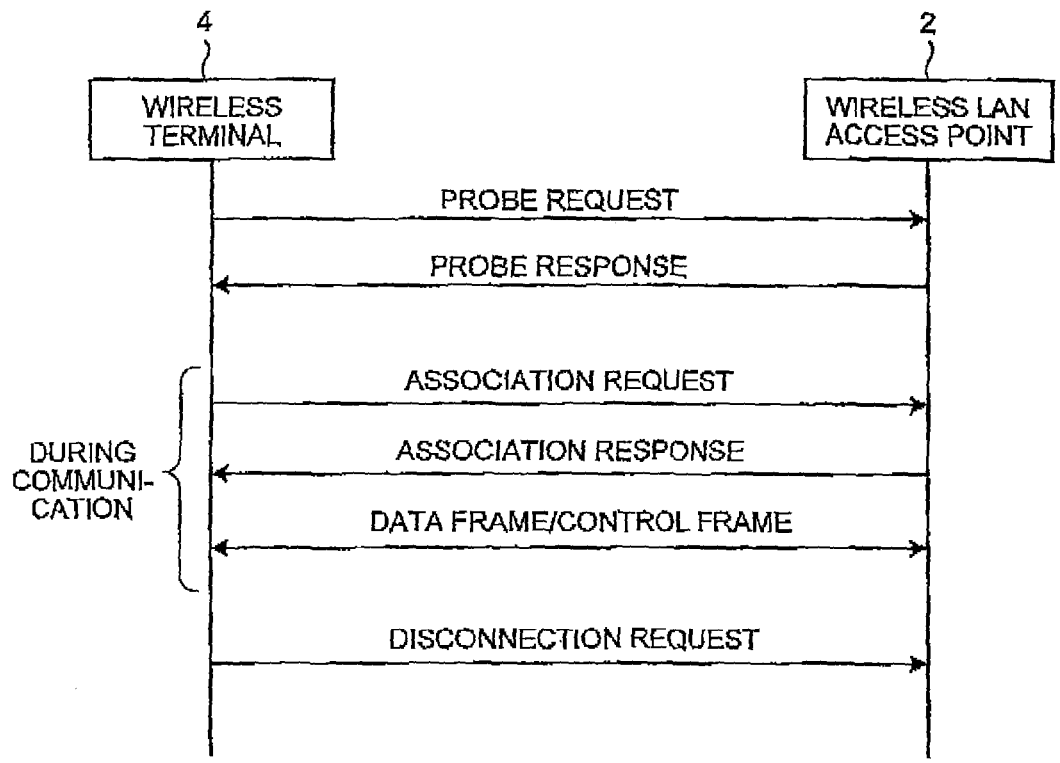
FIGS. 3A and 3B are diagrams describing sequences of a session establishment between a wireless LAN access point and a wireless terminal.
Figure 3B:
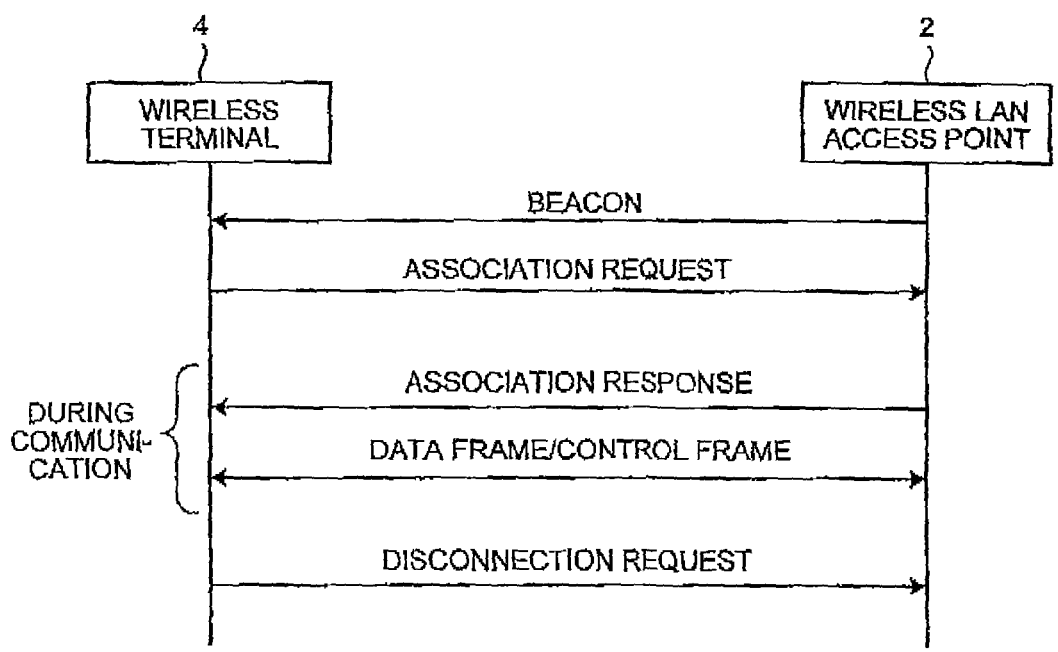

The detector 26 detects the existence of the wireless terminal 4 by obtaining the wireless packets transmitted from the wireless terminal 4 through the wireless IAN communication unit 20. FIGS. 3A and 3B illustrate the session establishment between the wireless LAN access point 2 and the wireless terminal 4.

In the example illustrated in FIG. 3A, a wireless packet referred to as a probe request is periodically transmitted from the wireless terminal 4, for example, by broadcasting. The detector 26 detects the existence of the wireless terminal 4 by obtaining the wireless packet through the wireless LAN communication unit 20.

The probe request includes a basic service set identifier (BSSID) such that the detector 26 transmits the probe response to the wireless terminal 4 when the BSSID corresponds to the BSSID of the wireless LAN communication unit 20. The wireless terminal 4 that has received the probe response is shifted to a during-communication state when being set to an automatic communication.

As illustrated in FIG. 3A, an association request and association response establishes a session. This shifts the wireless terminal 4 to the during-communication state. After that, a data frame and a control frame is transmitted and received between the wireless terminal 4 and the wireless LAN communication unit 20. Thus, the wireless terminal 4 and the wireless LAN communication unit 20 are brought into a state in which the wireless terminal 4 is communicated with the wireless LAN communication unit 20.

The detector 26 detects the existence of the wireless terminal 4 that does not periodically transmit a wireless packet, for example, by broadcasting a wireless packet referred to as a beacon to the wireless terminal 4 through the wireless LAN communication unit 20 and receiving an association request in response to the beacon as illustrated in FIG. 3B. The detector 26 that has received the association request establishes a session by transmitting an association response to the wireless terminal 4. This implements the during-communication state between the wireless terminal 4 and the wireless LAN communication unit 20.

After bringing the wireless terminal 4 and the wireless LAN communication unit 20 into the during-communication state, the detector 26 repeatedly receives the wireless packets and detects the existence of the wireless terminal 4 until the communication state is lifted. Note that the during-communication state is lifted when the wireless terminal 4 transmits a disconnect request or when the wireless packets is not transmitted and received between the wireless terminal 4 and the wireless LAN communication unit 20.

For example, when the detector 26 determines that the detector 26 has detected a wireless terminal 4, the detector 26 transmits the detection information including the terminal information of the wireless terminal 4 from the communication unit 21 to the information providing apparatus 3. Specifically, the detector 26 extracts the terminal ID from the wireless packet transmitted from the wireless terminal 4 and then detects the radio field intensity.

The terminal ID is, for example, the MAC address of the wireless LAN communication unit of the wireless terminal 4, and is transmitted from the wireless terminal 4 while being added to the wireless packet. The radio field intensity is the radio field intensity of the wireless signal received at the wireless LAN access point 2. Note that the radio field intensity can also be a radio field intensity received at the wireless terminal 4 (Received Signal Strength Indication (RSSI)). In that case, a wireless signal including the information on the radio field intensity is transmitted from the wireless terminal 4 to the wireless LAN access point 2.

The detector 26 transmits, to the information providing apparatus 3, the AP-ID and the information indicating whether the wireless terminal 4 is in the during-communication state in addition to the terminal ID of the wireless terminal 4 and the information on the radio field intensity. For example, the network address of the communication network 5 allocated to the communication unit 21 can be used as the AP-ID.

The detector 26 can also count the period while the wireless terminal 4 stays in the AP communication area. In that case, the period while the wireless terminal 4 stays can be transmitted to the information providing apparatus 3 while being included in the detection information.

5. Configuration of Information Providing Apparatus 3

Next, the specific configuration of the information providing apparatus 3 according to the embodiment will be described. As illustrated in FIG. 2, the information providing apparatus 3 includes a communication unit 30, a storage unit 31, and a control unit 32. The storage unit 31 includes a user information DB 33, and a location information DB 34. The control unit 32 includes a reception unit 35, an obtaining unit 36, a determination unit 37, a transmission unit 38, and an information provision unit 39.

The communication unit 30 is an interface, for example, a network interface card (NIC). The control unit 32 transmits and receives various types of information with the wireless LAN access point 2 through the communication unit 30 and the communication network 5, or with the wireless terminal 4 through the wireless LAN access point 2.

The user information DB 33 and the location information DB 34 are each, for example, a storage device such as a hard disk, a semiconductor memory device such as a random access memory (RAM), or a flash memory, or an optical disk. Note that the user information DB 33 and the location information DB 34 can be as a DB. Note that each ID stored in the user information DB 33 and the location information DB 34 will be described with a reference sign "A1", "U1" or the like. The reference signs are put in order to distinguish the IDs for convenience of description. However, the IDs are not limited to the reference signs.

The control unit 32 is implemented, for example, with an integrated circuit such as an application specific integrated circuit (ASIC) or a field programmable gate array (FPGA). A central processing unit (CPU) or a micro processing unit (MPU) executes the programs stored in the internal storage device using the RAM as the work area. This causes the control unit 32 to function as the reception unit 35, the obtaining unit 36, the determination unit 37, the transmission unit 38, and the information provision unit 39. Note that the configuration of the control unit 32 is not limited to the above-mentioned configuration. Another configuration that performs the information process to be described below can be used.

5.1. Reception Unit 35

The reception unit 35 receives the detection information transmitted from the wireless LAN access point 2 and various requests transmitted from the wireless terminal 4 through the wireless LAN access point 2.

After receiving the detection information transmitted from the wireless LAN access point 2, the reception unit 35 updates the terminal existence data in the location information DB 34 on the basis of the terminal information included in the detection information, the AP-ID, and the information indicating whether the terminal is in the during-communication state.

FIG. 4 is a diagram of an example of the terminal existence data. As illustrated in FIG. 4, the terminal existence data is the information in which a "terminal ID", a "check-in time", a "check-out time", and a "radio field intensity" are linked to each "AP-ID".

The "AP-ID" is the identification data of the wireless LAN access point 2 and is allocated to each wireless LAN access point 2.

The "terminal ID" is the terminal ID of the wireless terminal 4 existing in the communication area of the linked wireless LAN access point 2. In the example illustrated in FIG. 4, there are, for example, the wireless terminals $4_1$ to $4_4$ having the terminal IDs "T1" to "T4" in the communication area of the wireless LAN access point $2_1$ having the AP-ID "A1".

The "radio field intensity" is the information on the radio field intensity of the wireless terminal 4 in the AP communication area. The example in FIG. 4 conveniently illustrates the information on the latest radio field intensity corresponding to each terminal ID. However, the terminal existence data includes the information on the radio field intensities since the wireless terminal 4 has entered the AP communication area and the average value of the radio field intensities. The example in FIG. 4 illustrates the radio field intensity as intensity levels from 0 to 10 in which a higher intensity has a larger value. However, the radio field intensity can also be set with another unit (for example, dBm).

When receiving the terminal information including the information indicating that the terminal is in the during-communication state from the wireless LAN access point 2, the reception unit 35 sets the terminal ID and information on the radio field intensity included in the terminal information in the terminal existence data with linking the terminal ID and the information on the radio field intensity to the "AP-ID" included in the terminal information. The reception unit 35 sets the time when the wireless terminal 4 is brought into the during-communication state as a "check-in time" in the terminal existence data.

Comparing the check-in time with the current time can detect the period while the wireless terminal 4 has stayed in the AP communication area. Note that the reception unit 35 can set the time when the reception of the terminal information has started as the "entrance time" in the terminal existence data independently of whether the terminal is in the during-communication state.

When the wireless terminal 4 of which information has been set in the terminal existence data exits the AP communication area, the reception unit 35 sets the time when the wireless terminal 4 has exited as the "check-out time" in the terminal existence data and than delete the information on the wireless terminal 4 that has left from the terminal existence data. After that, the reception unit 35 manages the information on the wireless terminal 4 that has exited as the history information.

5.2. Obtaining Unit 36

The obtaining unit 36 obtains the information on the installation location of the wireless LAN access point 2 (hereinafter, also referred to as AP installation location information) and the information on the user of the wireless terminal 4 specified according to the detection information (hereinafter, also referred to as terminal user information) from the storage unit 31. The terminal user information that the obtaining unit 36 obtains is the information on the user of the wireless terminal 4 that has newly entered the AP communication area. The obtaining unit 36 can further obtain the information on the user of the wireless terminal 4 that stays the AP communication area for a given length of time or more as the terminal user information.

5.2.1. Obtaining AP Installation Location Information

Obtaining AP installation location information will be described first. The obtaining unit 36 obtains the AP installation location information from a location information table and location attribute information table stored in the location information DB 34. The AP installation location information includes, for example, a location attribute to be described below.

FIG. 5 is a diagram of an exemplary location information table. As illustrated in FIG. 5, the location information table includes the information in which an "AP-ID", a "location name", "notification information (via a LAN)", "notification information (via a WAN)", a "location attribute ID", and the like are linked to each location ID.

The "location ID" is the identification data of the AP installation location information and is set at each wireless LAN access point 2 or at every group of two or more wireless LAN access points 2.

The "AP-ID" is the identification data of the wireless LAN access point 2 installed at a location corresponding to the liked "location ID" and, for example, is the network address of the communication network 5 allocated to the communication unit 21 of the wireless LAN access point 2. The location information table illustrated in FIG. 5 indicates that the wireless LAN access point 2₁ having the AP-ID "A1" is installed at a location having the location ID "G1".

The "location name" is the name of an installation location of a wireless LAN access point 2. For example, the ID "G1" is linked to the "location name" of a "xx railway Roppongi station". The "notification information (via a LAN)" indicates the file name of the notification information to be notified to the wireless terminal 4 via the wireless LAN access point 2, and is stored in the location information DB 34. The "notification information (via a WAN)" indicates the file name of the notification information to be notified to the wireless terminal 4 via the mobile phone base station 7, and is stored in the location information DB 34.

In the location information table illustrated in FIG. 5, the "notification information (via a LAN)" of the location ID "G1" has a file name "noticeA11.data" and the "notification information (via a WAN)" has a file name "noticeA21.data".

The "location attribute ID" is the information indicating the attribute of the location of a linked "location ID". For example, in the location information table illustrated in FIG. 5, a "location attribute ID" "Z1" is linked to the location ID "G". The obtaining unit 36 obtains the information on the location attribute from the location attribute information table stored in the location information DB 34 as the AP installation location information on the basis of the location attribute XD set in the location information table.

FIG. 6 is a diagram of an exemplary location attribute information table. As illustrated in FIG. 6, the location attribute information table includes the information in which a "location attribute name", a "communication medium selecting condition", and the like are linked to each "location attribute ID" as the information on the location attribute.

The "location attribute name" is the name of a location attribute. For example, the location attribute ID "Z1" is linked to the "location attribute name" of a "public transportation (station)". The "communication medium selecting condition" is a condition for selecting a communication medium to notify notification information, and is set at each location attribute ID. For example, the location attribute ID "Z1" is linked to the "communication medium selecting condition" of a "first communication medium selection table/terminal moving attribute condition: 5, and 20/AP moving attribute condition: 30".

5.2.2. Obtaining Terminal User Information

Next, obtaining terminal user information will be described. The terminal user information includes the information on the moving state of the user of the wireless terminal 4 (hereinafter, sometimes referred to as user moving state information) and the attribute information of the user of the wireless terminal 4 (hereinafter, sometimes referred to as user attribute information).

5.2.2.1. Obtaining User Moving State Information

First, obtaining user moving state information will be described. The obtaining unit 36 obtains the user moving state information on the basis of the communication medium selecting condition obtained from the location attribute information table and the terminal information set in the terminal existence data.

As illustrated in FIG. 6, the communication medium selecting condition includes the information on the class of the communication medium selection tables (classifying the tables into a first communication medium selection table and a second communication medium selection table), and also includes a "terminal moving attribute condition" and an "AP moving attribute condition" corresponding to the first communication medium selection table. The obtaining unit 36 determines on the basis of the "terminal moving attribute condition" whether the wireless terminal 4 is in a moving state, and determines on the basis of the "AP moving attribute condition" whether the wireless terminal 4 stays in the same wireless LAN access point 2.

It is determined whether the wireless terminal 4 is in a moving state on the basis of the terminal existence data. (see FIG. 4). For example, a threshold of variation rate of the radio field intensity of the wireless terminal 4 (hereinafter, referred to as an intensity variation rate threshold) and a period of stay (hereinafter, referred to as a first period) are set in the "terminal moving attribute condition". The intensity variation rate threshold is, for example, a threshold of the radio field intensity variation rate per the first period. For example, when an intensity level has changed from "9" to "4" per predetermined period, the intensity variation rate is "5".

In the example illustrated in FIG. 6, the intensity variation rate threshold is set at "5" and the first period is set at "30 (seconds)" in the communication medium selecting condition of the location ID "Z1". Meanwhile, the intensity variation rate threshold is set at "4" and the first period is set at "10 (seconds)" in the communication medium selecting condition of the location ID "Z2".

The obtaining unit 36 obtains the radio field intensity and check-in time of the wireless terminal 4 existing in each of the wireless LAN access points 2 from the terminal existence data. When the radio field intensity variation rate of the wireless terminal 4 is less than the intensity variation rate threshold, the obtaining unit 36 determines that the "terminal moving attribute" is a "stop". On the other hand, when the radio field intensity variation rate is equal to or mote than the intensity variation rate threshold, the obtaining unit 36 determines that the "terminal moving attribute" is a "moving".

Note that, instead of the above-mentioned determination, the obtaining unit 36 can determine that the "terminal moving attribute" is a "stop" when the radio field intensity variation rate per predetermined period of the wireless terminal 4 is less than the intensity variation rate threshold and the period of stay of the wireless terminal 4 is longer than the first period, and can determine that the "terminal moving attribute" is a "moving" in other cases.

The threshold of the elapsed time since the wireless terminal 4 has transferred from the communication area of the wireless LAN access point 2 to the communication area of the current wireless LAN access point 2 (hereinafter, referred to as a second period threshold) is set in the "AP moving attribute condition". In the example illustrated in FIG. 6, the second period threshold is set at "30 (seconds)" in the communication medium selecting condition of the location "ID Z1" while the second period threshold is set at "10 (seconds)" in the communication medium selecting condition of the location ID "Z2".

The obtaining unit 36 obtains the radio field intensity and check-in time of the wireless terminal 4 existing in the communication area of each of the wireless LAN access points 2 from the terminal existence data. When the elapsed time since the wireless terminal 4 has transferred to the communication area of the current wireless LAN access point 2 is equal to or longer than the second period threshold, the obtaining unit 36 determines that the "AP moving attribute" is an "identification". On the other hand, when the elapsed time since the wireless terminal 4 has transferred to the communication area of the current wireless LAN access point 2 is less than the second period threshold, the obtaining unit 36 determines that the "AP moving attribute" is a "moving".

When obtaining user moving state information, the obtaining unit 36 sets the user moving state information in the terminal state information table stored in the location information DB 34. FIG. 7 is a diagram of an exemplary terminal state information table. As illustrated in FIG. 7, the terminal state information table includes the information in which a "terminal moving attribute", an "AP moving attribute", and the like are linked to each "terminal ID".

In the terminal state information table in illustrated in FIG. 7, for example, the wireless terminal 4 having the terminal ID "T1" is linked to the "terminal moving attribute" of a "moving", and the "AP moving attribute" of an "identification"; and the wireless terminal 4 having the terminal ID "T2" is linked to the "terminal moving attribute" of a "stop", and the "AP moving attribute" of an "identification". Further, the wireless terminal 4 having the terminal ID "T3" is linked to the "terminal moving attribute" of a "moving", and the "AP moving attribute" of a "moving"; and the wireless terminal 4 having the terminal ID "T4" is linked to the "terminal moving attribute" of a "stop", and the "AP moving attribute" of a "moving".

Note that the AP installation location of the location attribute ID "Z1" is a public transportation (station) and the AP installation location of the location attribute ID "Z2" is a public transportation (train) in the location attribute information table illustrated in FIG. 6. When the user of the wireless terminal 4 gets on the train corresponding to the location attribute ID "Z2" from the platform of the station corresponding to the location attribute ID "Z1", the "AP moving attribute" of the wireless terminal 4 becomes a "moving". However, the "terminal moving attribute" of the wireless terminal 4 sometimes becomes "stop" because the amount of movement of the user of the wireless terminal 4 is small.

As described above, the obtaining unit 36 can obtain the user moving state information on the basis of the communication medium selecting condition obtained from the location attribute information table and the terminal information set in the terminal existence data. Further, each location attribute ID can include different values as the intensity threshold and the first period threshold. This can obtain the user moving state information according to the installation location of a wireless LAN access point 2.

5.2.2.2. Obtaining User Attribute Information

Next, obtaining user attribute information will be described. The obtaining unit 36 obtains user attribute information on the basis of the terminal information set in the terminal existence data and the information set in the user information table.

FIG. 8 is a diagram of an exemplary user information table. As illustrated in FIG. 8, the user information table includes the information in which a "terminal ID", a "WAN-ID", and a "user attribute" are linked to each "user ID". The "terminal ID", the "WAN-ID", and the "user attribute" are, for example, the information included in a registration request from the wireless terminal 4 to the information providing apparatus 3. When the wireless terminal 4 is registered as a user in the information providing apparatus 3, the reception unit 35 sets the wireless terminal 4 in the user information table.

For example, the wireless terminal 4 can be registered as a user in the information providing apparatus 3 via the mobile phone communication network 6. In that case, the reception unit 35 of the information providing apparatus 3 allocates a user ID to a request for the user registration transmitted from the wireless terminal 4. The information including the terminal ID, the WAN-ID, and the user attribute and included in the request of the user registration is set in the user information table.

The "user ID" is allocated to each of the users of the wireless terminals 4. For example, when the wireless terminal 4 is registered as a user in the information providing apparatus 3, the reception unit 35 sets the "user ID" in the user information table.

The "terminal ID" is the identification data of the wireless terminal 4 on the wireless LAN communication unit side and, for example, a media access control (MAC) address allocated to the wireless LAN communication unit of the wireless terminal 4. In that case, the wireless terminal 4 communicates with the wireless LAN access point 2 by transmitting and receiving a wireless packet including the terminal ID. Note that any terminal ID that can identify the wireless terminal 4 can be used. The terminal ID is not necessarily limited to a MAC address.

The "WAN-ID" is the identification data of the wireless terminal 4 on the mobile phone communication unit side. For example, when the wireless terminal 4 is a third generation mobile telecommunication system, the WAN-ID is a specific number of the subscriber identity module (SIM) card included in the wireless terminal 4. The specific number is also referred to as an international mobile subscriber identity (IMSI). The wireless terminal 4 communicates with the mobile phone base station 7 by transmitting and receiving a wireless packet including the WAN-ID.

The user attribute is the user attribute information of the user of the wireless terminal 4. The user attribute includes a demographic attribute and a psychographic attribute. The demographic attribute includes, for example, attributes of the sex, age, occupation, and car of the user. The psychographic attribute includes, for example, attributes of the values, lifestyle, character, and taste of the user. In the user information table illustrated in FIG. 8, a personal computer, cake, and the like are set as the attributes and the attribute in which the user is interested is set at "1" and the others are set at "0".

For example, when the wireless terminal 4 is registered as a user in the information providing apparatus 3, the reception unit 35 sets the user attribute in the user information table. Note that the user attribute illustrated in FIG. 8 is an example. Various attributes can be set in the user information table.

The obtaining unit 36 obtains, from the user information table, the user attribute information of the terminal user linked to the terminal ID of the wireless terminal 4 of which the terminal information is included in the terminal existence data. For example, when the user information table is in the state illustrated in FIG. 8, the obtaining unit 36 obtains the user attribute information of the terminal user having the terminal ID "T1" that includes that the sex is "male", the age is "25 years old", the occupation is "a student of xx school", the car is "none", the personal computer is "1", and the like as the user information.

5.3. Determination Unit 37

The determination unit 37 determines either the wireless LAN access point 2 or the mobile phone base station 7, on the basis of the information obtained in the obtaining unit 36, as communication medium that notifies the notification information.

Specifically, the determination unit 37 selects the communication medium to notify the notification information on the basis of the communication medium selecting condition set for each location attribute ID linked to the AP-ID. The communication medium selecting condition includes the information on the class of the communication medium selection table such that the determination unit 37 selects the communication medium to notify the notification information in a selection method according to the class information.

5.3.1. Selection of Communication Medium Using First Communication Medium Selection Table When the class information of the communication medium selection table is the first communication medium selection table, the determination unit 37 selects the communication medium to notify the notification information on the basis of the first communication medium selection table and the user moving state information obtained in the obtaining unit 36.

FIG. 9A is a diagram of an exemplary first communication medium selection table. As illustrated in FIG. 9A, the first communication medium selection table includes the information indicating the correspondence relationship between a "terminal moving attribute" and "AP moving attribute" and a communication medium.

In the example illustrated in FIG. 9A, when the wireless terminal 4 has the "terminal moving attribute" that is a "moving" and the "AP moving attribute" that is a "moving", the determination unit 37 selects the "RAN" as the communication medium. When the wireless terminal 4 has the "AP moving attribute" that is an "identification", the determination unit 37 selects the "LAN" as the communication medium regardless of the "terminal moving attribute".

When the wireless terminal 4 has the "terminal moving attribute" that is a "stop" and the "AP moving attribute" that is a "moving" and when the wireless LAN access point 2 is set in the same group before and after the movement, the determination unit 37 selects the "LAN" as the communication medium, and selects the "WAN" as the communication medium in the other cases.

Note that, when the AP-IDs are held by the same company (when the AP-IDs "A1" and "A2" are held by the same "xx railway" in the example illustrated in FIG. 5), the determination unit 37 determines that the wireless LAN access point 2 is in the same group. Whether the wireless LAN access point 2 is in the same group is determined not only depending on whether the same company holds the AP-IDs. Whether the wireless LAN access point 2 is in the same group can also be set, for example, in a group table (not illustrated in the drawings) of the location information DB 34 in advance.

At that time, it is assumed that the terminal existence data, the location information table, the location attribute information table and the terminal state information table are in the states illustrated in FIGS. 4 to 7, respectively. In that case, the wireless terminals 4 having the terminal IDs "T1" to "T4" exist in the communication area of the wireless LAN access point 2 having the AP-ID "A1". The wireless terminals 4 have the "terminal moving attributes" that are a "moving", a "stop", a "moving" and a "stop", respectively; and have the "AP moving attributes" that are an "identification", an "identification", a "moving", and a "moving", respectively.

The "xx railway Roppongi station" is the installation location of the wireless LAN access point 2 having the AP-ID "A1" in which the wireless terminals 4 having the terminal IDs "T1" to "T4" exist. The location attribute ID "Z1" of the "xx railway Roppongi station" is linked to the class information of the communication medium selection table that is the "first communication medium selection table".

When the first communication medium selection table is in the state illustrated in FIG. 9A, the determination unit 37 determines the wireless LAN access point 2 having the AP-ID "A1" as the communication medium to notify the notification information to the wireless terminals 4 having the terminal IDs "T1" and "T2", and determines the mobile phone base station 7 as the communication medium to notify the notification information to the wireless terminal 4 having the terminal ID "T3".

When the wireless terminal 4 having the terminal ID "T4" moves, for example, from the wireless LAN access point 2 having the AP-ID "A2" to the wireless LAN access point 2 having the AP-ID "A1" in the same group, the determination unit 37 determines the mobile phone base station 7 as the communication medium to notify the notification information to the wireless terminal 4 having the terminal ID "T4".

On the other hand, when the wireless terminal 4 having the terminal ID "T4" moves from a wireless LAN access point 2 to the wireless LAN access point 2 having the AP-ID "A1" and the wireless LAN access points 2 are not in the same group, the determination unit 37 determines the wireless LAN access point 2 having the AP-ID "A1" as the communication medium to notify the notification information to the wireless terminal 4 having the terminal ID "T4".

As described above, on the basis of the moving state of the wireless terminal 4, the determination unit 37 can determine either the wireless LAN access point 2 or the mobile phone base station 7 as communication medium that notifies the notification information. This can appropriately notify the notification information to the wireless terminal 4.

For example, when the notification information is notified from the wireless LAN access point 2 just before the wireless terminal 4 exits an AP communication area, the wireless terminal 4 sometimes leaves out of the AP communication area. When the wireless terminal 4 moves as described above, the notification information can be notified from the mobile phone base station 7. This can surely notify the notification information.

For example, the terminal user moves and stays in the AP communication area that is a meeting spot in a different way from the AP communication area that is a public transportation station. However, setting the determination of the moving state of the terminal user in the AP communication area at each AP installation location can appropriately detect the moving state of the terminal user.

Further, the moving state of the terminal user can be determined on the basis of the terminal information detected at the wireless LAN access point 2. Thus, the moving information of the wireless terminal 4 can appropriately be determined, for example, even when the wireless terminal 4 does not include a GPS.

5.3.2. Selection of Communication Medium Using Second Communication Selection Table When the class information of the communication medium selection table is the second communication medium selection table, the determination unit 37 selects the communication medium to notify the notification information on the basis of the second communication medium selection table and the user attribute information obtained in the obtaining unit 36.

FIG. 9B is a diagram of an exemplary second communication medium selection table. As illustrated in FIG. 9B, the second communication medium selection table includes the user attribute information corresponding to the "WAN" and the user attribute information corresponding to the "LAN".

In the example illustrated in FIG. 9B, for example, the determination unit 37 selects the "WAN" as the communication medium for the wireless terminal 4 having the terminal ID linked to the demographic attribute "car" of which information is a "driver" in the user information table, and selects the "LAN" as the communication medium for the wireless terminal 4 having the terminal ID having the other types of information.

When the location information table and the location attribute information table are in the states illustrated in FIGS. 5 and 6, the type of the communication medium selecting condition of the location attribute ID "26" linked to the AP-ID "A6" is the second communication medium selection table. The user attribute of the wireless terminal 4 having the terminal ID "T1" illustrated in FIG. 8 includes the "student of xx school". Thus, the determination unit 37 selects the "LAN" as the communication medium for the wireless terminal 4 having the terminal ID "T1" on the basis of the second communication medium selection table illustrated in FIG. 9B.

The "xx" is the car's unique identification data and, for example, is regional name+school name. The determination unit 37 selects the communication medium for the wireless terminal 4 of the terminal user having the user attribute linked to the "regional name+school name" set in the location information table.

Thus, in the communication area of the wireless LAN access point 2 installed in a school (hereinafter, sometimes referred to as a school AP), the "LAN" is selected as the communication medium for the user of the wireless terminal 4 set as a party linked to the school AP (for example, a student or a teacher). On the other hand, the "WAN" is selected as the communication medium for the user of the wireless terminal 4 who is not set as a party linked to the school AP.

When the location information table and the location attribute information table are in the states illustrated in FIGS. 5 and 6, the type of the communication medium selecting condition of the location attribute ID "Z5" linked to the AP-ID "A5" is the second communication medium selection table. The user attribute of the wireless terminal 4 having the terminal ID "T2" includes a "driver of xx's car". Thus, the determination unit 37 selects the "WAN" as the communication medium for the wireless terminal 4 having the terminal ID "T2" on the basis of the second communication medium selection table illustrated in FIG. 9B.

The "xx" is the car's unique identification data and, for example, a license plate number or the ID of the car owner. The determination unit 37 selects a communication medium for the wireless terminal 4 of the terminal user having the user attribute linked to the car name set in the location information table.

Thus, in the communication area of the wireless LAN access point 2 mounted on a car (hereinafter, sometimes referred to as a car-mounted AP), the "WAN" is selected as the communication medium for the user of the wireless terminal 4 set as a driver linked to the car-mounted AP. On the other hand, the "LAN" is selected as the communication medium for the user of the wireless terminal 4 who is not set as a driver linked to the car-mounted AP.

The determination unit 37 can also select the "LAN" as the communication medium for the user of the wireless terminal 4 who has a predetermined relationship with the driver (for example, a family member, friend, partner of the driver) among the wireless terminals 4 that are not set as the driver linked to the car-mounted AP, and does not select a communication medium for the wireless terminals 4 of other users. In that case, a communication medium is set for the wireless terminal 4 having, for example, an attribute "a friend of the driver of xx's car" in the attribute "car" of the user information table.

As described above, selecting a communication medium using the second communication selection table can select the communication medium to notify the notification information according to whether the attribute indicates a party to the AP installation location (for example, a driver or a school official). This can select an appropriate communication medium for an AP installation location.

5.3.3. Selection of Communication Medium Using Communication Subscription Table

The determination unit 37 selects the communication medium to notify the notification information on the basis of the communication medium selecting condition set in each location attribute ID. However, when the "WAN" is selected as the communication medium, the determination unit 37 sometimes changes the communication medium to the "LAN" on the basis of the communication subscription table stored in the user information DB 33.

FIG. 10 is a diagram of an exemplary communication subscription table. As illustrated in FIG. 10, the communication subscription table includes the information linked to the information including a "communication subscription condition", a "used packet amount", and a "WAN notification upper limit". The reception unit 35 repeatedly updates the communication subscription table, for example, on the basis of the information notified from a telecom company.

The types of communication plan that the user of the wireless terminal 4 subscribes to the telecom company are set in the "communication subscription condition". In the exemplary communication subscription table illustrated in FIG. 10, the wireless terminal 4 having the terminal ID "T1" subscribes a communication plan in which the upper limit of packet usage amount is "400,000 packets per month" and the wireless terminal 4 having the terminal ID "T2" subscribes a communication plan in which the upper limit of packet usage amount is "one million packets per month".

The "used packet amount" is the amount of packets that the wireless terminal 4 has used in the latest period determined by the communication subscription condition (for example, on a monthly basis). In the exemplary communication subscription table illustrated in FIG. 10, the wireless terminal 4 having the terminal ID "T1" has the upper limit of used packet amount is "400,000 packets" and the wireless terminal 4 having the terminal ID "T2" has the upper limit of used packet amount is "550,000 packets".

The conditions for notifying notification information from the mobile phone base station 7 are set in the "WAN notification upper limit". In the exemplary communication subscription table illustrated in FIG. 10, the wireless terminal 4 having the terminal ID "T1" includes the "WAN notification upper limit" that is "300,000 packets per month" and the wireless terminal 4 having the terminal ID "T2" includes the "WAN notification upper limit" that is "800,000 packets per month".

When the used packet amount of the wireless terminal 4 satisfies the WAN notification upper limit, the determination unit 37 maintains the "WAN" as the selected communication medium. On the other hand, when the used packet amount of the wireless terminal 4 does not satisfy the WAN notification upper limit, the determination unit 37 changes the selected communication medium to the "LAN".

For example, when the communication subscription table is in the state illustrated in FIG. 10, the used packet amount of the wireless terminal 4 having the terminal ID "T1" does not satisfy the WAN notification upper limit. Thus, the determination unit 37 changes the communication medium for the wireless terminal 4 having the terminal ID "T1" to the "LAN". On the other hand, the used packet amount of the wireless terminal 4 having the terminal ID "T2" satisfies the WAN notification upper limit. Thus, the determination unit 37 maintains the "WAN" as the communication medium for the wireless terminal 4 having the terminal ID "T2".

As described above, when the used packet amount is equal to or higher than a threshold set in the communication subscription condition specified in the communication subscription condition, selecting the "WAN" as the communication medium to notify the notification information is prevented.

This can prevent notification of notification information from causing the used packet amount to exceed the threshold specified in the communication subscription condition. Some telecom companies specify the upper limit of usage on heavy users. When the usage exceeds the upper limit of usage, the company takes measures including the limitation on the communication rate. Even in such a case, the communication medium to notify the notification information can appropriately be selected. Note that it is also possible that the determination unit 37 does not change the communication medium to the "LAN" on the basis of the communication subscription table stored in the location information DB 34.

It is also possible that the determination unit 37 selects the "LAN" or the "WAN" as the communication medium on the basis of the communication subscription table without using the first and the second communication medium selection table to select the communication medium. In such a case, the determination unit 37 selects the "WAN" as the communication medium, for example, when the communication amount between the wireless LAN access point 2 and the communication network 5 is equal to or higher than a predetermined threshold. Even in that case, when determining on the basis of the communication subscription table that the notification of the notification information causes the used packet amount to exceed the threshold specified in the communication subscription condition or the WAN notification upper limit, the determination unit 37 selects the "LAN" as the communication medium.

Note that the communication plans include an all-you-can-eat subscription plan that does not have the upper limit of packet usage amount or a pay-as-you-go plan. In the all-you-can-eat subscription plan, it is also possible that the determination unit 37 does not perform a process on the basis of the communication subscription table. In the pay-as-you-go plan, it is possible that the determination unit 37 constantly sets the communication medium at the "LAN".

5.4. Transmission Unit 38

The transmission unit 38 causes the communication medium determined by the determination unit 37 to notify the notification information in the location information table stored in the location information DB 34 to the wireless terminal 4 specified according to the detection information.

As illustrated in FIG. 5, the location information table includes the "notification information (via the LAN)" and the "notification information (via the WAN)". The transmission unit 38 obtains the notification information according to the communication medium determined by the determination unit 37 based the location information table.

When the determination unit 37 selects the "WAN", the transmission unit 38 obtains, from the location information table, the notification information set in the "notification information (via the WAN)" linked to the AP-ID of the wireless LAN access point 2 that has detected the wireless terminal 4 specified according to the detection information in order to transmit the notification information intended for the wireless terminal 4 from the communication unit 30 to the mobile phone communication network 6. The address of the wireless terminal 4 is selected from the user information table in the mobile phone communication network 6.

For example, when the user information table is in the state illustrated in FIG. 8, and when the destination of the notification information is the wireless terminal 4 having the terminal ID "T1", the transmission unit 38 reads a WAN-ID "W1" from the user information table in order to transmit the notification information intended for the WAN-ID "W1" from the communication unit 30 to the mobile phone communication network 6. This can notify the notification information from the mobile phone base station 7 to the wireless terminal 4 having the WAN-ID "W1".

On the other hand, when the determination unit 37 selects the "LAN", the transmission unit 38 obtains, from the location information table, the notification information set in the "notification information (via the LAN)" linked to the AP-ID of the wireless LAN access point 2 that has detected the wireless terminal 4 specified according to the detection information in order to transmit the notification information intended for the wireless terminal 4 from the communication unit 30 to the wireless LAN access point 2. The address of the wireless terminal 4 in the wireless LAN access point 2 is selected from the user information table.

For example, when the user information table is in the state illustrated in FIG. 8, and when the destination of the notification information is the wireless terminal 4 having the terminal ID "T2", the transmission unit 38 reads the terminal ID "T2" from the user information table in order to transmit the notification information including the terminal ID "T2" from the communication unit 30 to the wireless LAN access point 2. When receiving the notification information from the information providing apparatus 3, the wireless LAN access point 2 transfers the notification information to the wireless terminal 4 having the terminal ID "T2". This can notify the notification information from the wireless LAN access point 2 to the wireless terminal 4 having the terminal ID "T2".

The "notification information (via the LAN)" is, for example, the digital contents about the AP installation location or the contents of a shopping website, and relatively has a large information amount. FIG. 11A is a diagram of an exemplary screen of the notification information via the wireless LAN access point 2 is displayed on the display unit of the wireless terminal 4. In the example illustrated in FIG. 11A, the information, video and the like about the product sold at XX electric store located around the Roppongi station are displayed as the notification information on the display unit of the wireless terminal 4.

The communication via the wireless LAN access point 2 is often performed at a relatively fast communication rate. Thus, even when the notification information has a relatively large information amount, the wireless terminal 4 can obtain the notification information at a high communication rate. Accordingly, the notification information can be notified to the wireless terminal 4 at the right time. Further, the communication via the wireless LAN access point 2 often keeps the communication fees at a low or zero cost. This reduces the cost burden on the user of the wireless terminal 4.

The terminal user stopping (staying) at an AP communication area is often interested in the state in the AP communication area. Thus, notifying the detailed information from the wireless LAN access point 2 at a relatively high communication rate can appropriately provide the information to the terminal user.

On the other hand, the "notification information (via the WAN)" is, for example, brief information on the AP installation location and has a relatively small information amount. FIG. 11B is a diagram of an exemplary screen of the notification information via the mobile phone base station 7 displayed on the display unit of the wireless terminal 4. In the example illustrated in FIG. 11B, the information indicating that a microwave oven is sold at a special limited offer price at XX electric store located around the Roppongi station is displayed as the notification information on the display unit of the wireless terminal 4.

The communication via the mobile phone base station 7 is often performed at a relatively slow communication rate. Thus, using information having a relatively small information amount as the notification information provides the notification information to the wireless terminal 4 at a high communication rate. Accordingly, the notification information can be notified to the wireless terminal 4 at the right time. The communication via the mobile phone base station 7 is often relatively expensive, and the upper limit of usage is often put thereon. This can reduce the cost burden on the user of the wireless terminal 4.

The user moving among the AP communication areas is often not interested in the state of the AP communication areas so much. Thus, notifying the notification information having a relatively small information amount can prevent the terminal user from being bothered by the information.

5.5. Information Provision Unit 39

When the wireless terminal 4 sends an information provision request via the wireless LAN access point 2, the information provision unit 39 transmits the information corresponding to the information provision request to the wireless terminal 4 that is the source of the request via the wireless LAN access point 2.

The information corresponding to the information provision request is stored for each location ID in the location information DB 34. On the basis of the location ID linked to the AP-ID of the wireless LAN access point 2 that has transferred the information provision request, the information provision unit 39 obtains the information from the location information DB 34 in order to transmit the information to the wireless terminal 4.

For example, when the display unit of the wireless terminal 4 is a touch panel display, the user of the wireless terminal 4 transmits an information provision request from the wireless terminal 4 by selecting the notification information displayed on the display unit of the wireless terminal 4 illustrated in FIG. 11A or 11B.

6. Flow of Process with Information Providing System 1

Figure 12:
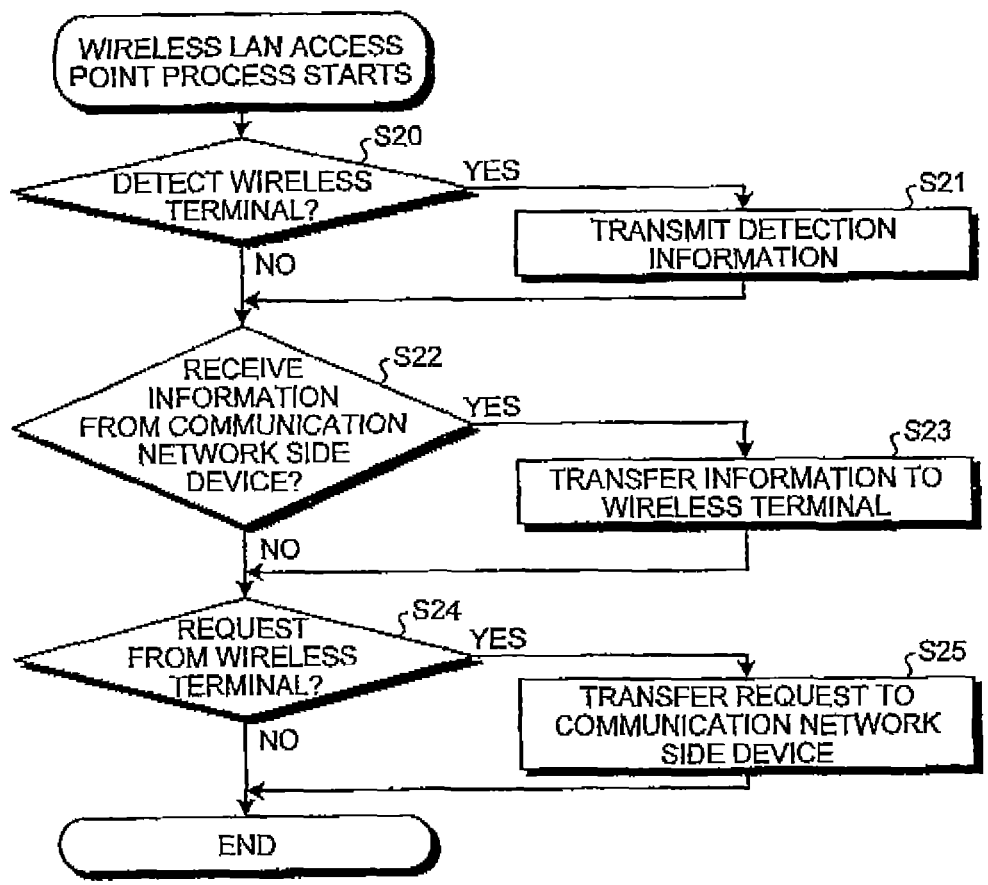
FIG. 12 is a flowchart of an information process at a wireless LAN access point.
Figure 13:
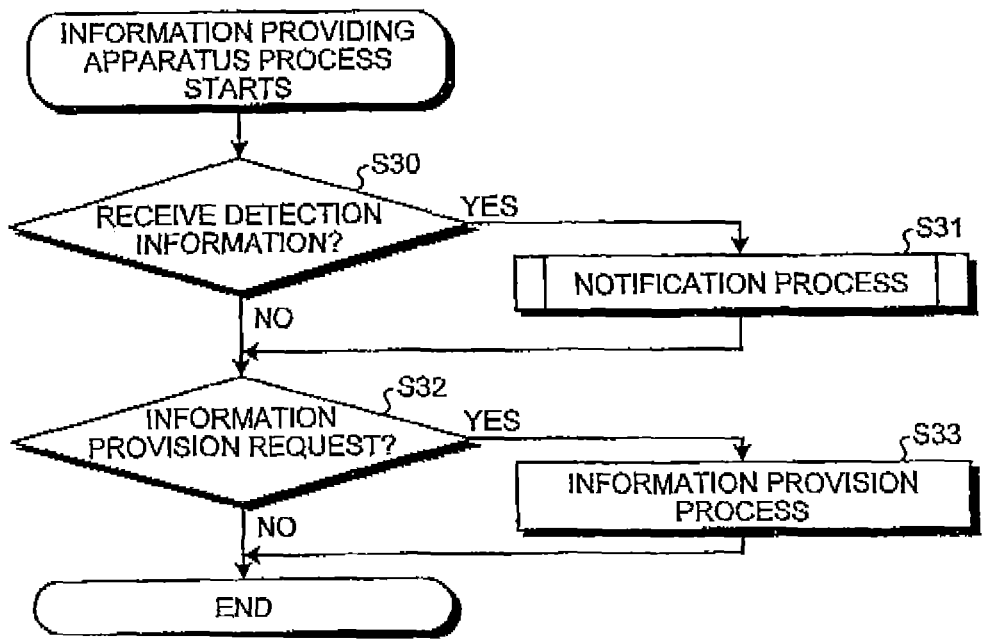
FIG. 13 is a flowchart of an information process in an information providing apparatus.
Figure 14:
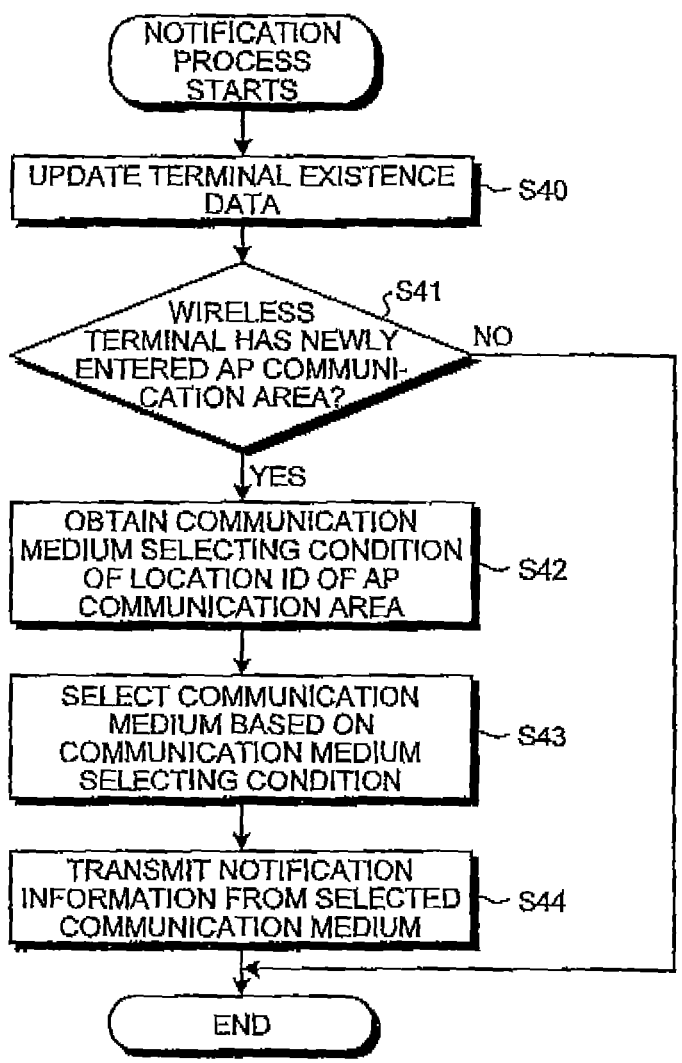
FIG. 14 is a flowchart of a notification process illustrated in FIG. 13.

Next, the procedures of the information provision process with the information providing system 1 according to the embodiment will be described. FIGS. 12 to 14 are diagrams for describing the flow of the information provision process with the information providing system 1.

Hereinafter, the process in the wireless LAN access point 2 will be described with reference to FIG. 12, and the process in the information providing apparatus 3 will be described with reference to FIGS. 13 and 14.

6.1. Flow of Process in Wireless LAN Access Point 2

First, the information process in the wireless LAN access point 2 according to the embodiment will be described with reference to FIG. 12. FIG. 12 is a flowchart of an information process in the wireless LAN access point 2. The process is repeated with the control unit 22 in the wireless LAN access point 2.

As illustrated in FIG. 12, the control unit 22 in the wireless LAN access point 2 determines whether the wireless LAN access point 2 has detected a wireless terminal 4 through the wireless LAN communication unit 20 (step S20). When determining in the process that the wireless LAN access point 2 has detected a wireless terminal 4 (Yes in step S20), the control unit 22 transmits the detection information including the terminal information, the AP-ID and the information indicating whether the wireless terminal 4 is the during-communication state to the information providing apparatus 3 through the communication unit 21 (step S21).

When the control unit 22 determines in the procedure of step S20 that the wireless LAN access point 2 has not detected a wireless terminal 4 (No in step S20), or when the procedure of step S21 is terminated, the control unit 22 determines whether the wireless LAN access point 2 has received the information from a device connected to the communication network 5 (hereinafter, referred to as a communication network side device) through the communication unit 21 (step S22). When determining that the wireless LAN access point 2 has received the information from a communication network side device (Yes in step S22), the control unit 22 transfers the received information to the wireless terminal 4 that is the destination of the information (step S23).

When the control unit 22 determines in step S22 that the wireless LAN access point 2 has not received the information (No in step S22), or when the procedure in step S23 is terminated, the control unit 22 determines whether there is a request from the wireless terminal 4 to the communication network side device (step S24). When determining that there is a request from the wireless terminal 4 to the communication network side device (Yes in step S24), the control unit 22 transfers the request from the wireless terminal 4 to the communication network side device via the communication unit 21 to the communication network side device (step S25).

When the procedure in step S25 is terminated, or when it is determined in step S24 that there is not a request from the wireless terminal 4 to the communication network side device (No in step S24), the control unit 22 terminates the process. The control unit 22 can perform, for example, the procedures in steps S20 and S21, the procedures in steps S22 and S23, and the procedures in steps S24 and S25 using multitasking.

6.2. Flow of Process in Information Providing Apparatus 3

Next, the process in the information providing apparatus 3 will be described. FIG. 13 is a flowchart of an information process in the information providing apparatus 3. The process is repeated with the control unit 32 in the information providing apparatus 3.

As illustrated in FIG. 13, the control unit 32 determines whether the information providing apparatus 3 has received the detection information from the wireless LAN access point 2 through the communication unit 30 (step 330). When determining that the information providing apparatus 3 has received the detection information (Yes in step S30), the control unit 32 performs a notification process (step S31). The notification process is performed in steps S40 to S44 illustrated in FIG. 14 and is to be described below.

When the information providing apparatus 3 has not received the detection information in step S30 (No in step S30), or when the procedure in step S31 is terminated, the control unit 32 determines whether the information providing apparatus 3 has received an information provision request from the wireless terminal 4 through the communication unit 30 (step S32). When the information providing apparatus 3 has received an information provision request (Yes in step S32), the control unit 32 performs an information provision process in response to the information provision request (step S33).

When the procedure in step 933 is terminated, or when the information providing apparatus 3 has not received an information provision request in step S32 (No in step S32), the control unit 32 terminates the process.

Next, the notification process in step S31 illustrated in FIG. 13 will be described. FIG. 14 is a flowchart of the notification process in the control unit 32 of the information providing apparatus 3.

As illustrated in FIG. 14, the control unit 32 updates the terminal existence data in the notification process on the basis of the received detection information (step S40).

Next, the control unit 32 determines on the basis of the updated terminal existence data whether there is a wireless terminal 4 that has newly entered the AP communication area (step S41). When determining that there is a wireless terminal 4 that has newly entered the AP communication area (Yes in step S41), the control unit 32 obtains the information on the communication medium selecting condition of the location ID of the AP communication area from the location attribute information table (step S42).

Next, the control unit 32 selects, on the basis of the communication medium selecting condition obtained form the location attribute information table, the communication medium to transmit the notification information (step S43). Then, the control unit 32 transmits the notification information intended for the wireless terminal 4 to the selected communication medium such that the selected communication medium notifies the notification information to the wireless terminal 4 (step S44).

When the process in step S44 is terminated, or when it is determined in step S41 that there is not a wireless terminal 4 that has newly entered the AP communication area (No in step S41), the control unit 32 terminates the process.

7. Variation

In the above-mentioned embodiment, the obtaining unit 36 obtains the user moving state on the basis of the period of stay and radio wave intensity of the wireless terminal 4 such that a communication medium to notify the notification information is selected on the basis of the user moving state. However, the obtaining unit 36 can also obtain the user moving state on the basis of one of the period of stay and radio wave intensity of the wireless terminal 4.

In the above-mentioned embodiment, the determination unit 37 selects the communication medium to notify the notification information on the basis of the first communication medium selection table or the second communication medium selection table. However, the determination unit 37 can also select the communication medium to the notify notification information, for example, using another selection table.

For example, the determination unit 37 can also be provided with a selection table having thresholds on the period of stay and radio wave intensity at each AP installation location so as to select a communication medium to notify the notification information on the basis of the selection table. In such a manner, the determination unit 37 can also determine the communication medium to notify the notification information on the basis of one of the period of stay and radio wave intensity of the wireless terminal 4, and can appropriately detect the state of the terminal user at each AP installation location.

In the above-mentioned embodiment, the determination unit 37 determines the communication medium to notify the notification information using the user moving state or user attribute information at each AP installation location. The determination unit 37 can also determine the "WAN" or the "LAN" as the communication medium to notify the notification information at each AP installation location. In such a case, for example, the condition to determine the "WAN" or the "LAN" as a communication medium to notify the notification information every period can be set at each AP installation location.

Further, different devices can be used as a wireless LAN access point 2 for detection and a wireless LAN access point 2 for notification. In such a case, a wireless LAN access point 2"for detection and a wireless LAN access point 2 for notification are installed at an AP installation location. The wireless LAN" access point 2 for detection and the wireless LAN access point 2 for notification preferably have almost the same communication area. However, the wireless LAN access point 2 for detection and the wireless LAN access point 2 for notification do not have to have the identical communication area.

The control unit 32 in the information providing apparatus 3 obtains the detection information transmitted from the wireless LAN access point 2 for detection in order to select the communication medium to transmit the notification information. When selecting a wireless LAN access point 2 as the communication medium, the control unit 32 transmits the notification information intended for the wireless terminal 4 to the wireless LAN access point 2 for notification. This notifies the notification information intended for the wireless terminal 4 from the wireless LAN access point 2 for notification to the wireless terminal 4.

As described above, using different devices as a wireless LAN access point 2 for detection and a wireless LAN access point 2 for notification, in other words, installing a wireless LAN access point 2 for detection at a location at which a wireless LAN access point 2 has already been installed can provide the above-mentioned information provision service. The wireless LAN access point 2 for detection is used for detecting a wireless terminal 4 and is not used for relaying information. Thus, a wireless LAN access point 2 having a few functions can be installed. This can readily provide the information provision service.

In the above description, the user attribute information set in the user information table is cited as an example of the user attribute information of the wireless terminal 4. However, the user attribute information is not limited to the example. For example, the obtaining unit 36 can also obtains the behavior history of the user of the wireless terminal 4 at the installation location of the wireless LAN access point 2 as the user attribute information.

The behavior history of the user includes, for example, the frequencies in purchase of the products and in visit to the store at the AP installation location, and is transmitted from the device installed at the AP installation location to the information providing apparatus 3. The determination unit 37 determines, on the basis of the behavior history of the user of the wireless terminal 4 specified according to the detection information, the communication medium to notify the notification information.

As a result, for example, when the action points based on the behavior history of the user is equal to or higher than a predetermined threshold, the "LAN" is selected as the communication medium to notify the notification information. When the action points based on the behavior history of the user is less than a predetermined threshold, the "WAN" is selected as the communication medium to notify the notification information. Thus, only when the user has high action points, the detailed information can be provided via the "LAN". Note that the action point is according to the purchase amount of the products at the AP installation location or according to the number of visits to the store.

In the above-mentioned embodiment, the communication subscription table includes the information in which the "communication subscription condition", the "used packet amount", and the "WAN communication upper limit" are linked to each other. However, another communication subscription table can be used. For example, the communication subscription table including parental control and a kids attribute can be used. In such a case, the determination unit 37 selects the "LAN" as the communication medium for the wireless terminal 4 having the terminal ID of which communication subscription table includes parental control and a kids attribute. This can select a communication medium appropriate for the user attribute.

In such a case, the control unit 32 in the information providing apparatus 3 sends a request to the wireless LAN access point 2 in order to limit the contents for the wireless terminal 4 having the terminal ID for which parental control and a kids attribute are set. The wireless LAN access point 2 blocks, on the basis of the request from the information providing apparatus 3, predetermined contents among the contents intended for the wireless terminal 4 from the communication network side device.

8. Effect

As described above, at the wireless LAN access point 2 in the information providing system 1 according to the embodiment, the detector 26 (an example of a detection unit) detects a wireless terminal 4 existing in the communication area of the wireless LAN access point 2; and the detector 26 (an example of a detection information transmission unit) transmits the detection information including the information on the detected wireless terminal 4 to the information providing apparatus 3. At the information providing apparatus 3, the location information DB 34 (an example of an information storage unit) stores the notification information corresponding to the wireless LAN access point 2; the reception unit 35 (an example of a reception unit) receives the detection information transmitted from the wireless. LAN access point 2; the obtaining unit 36 (an example of an obtaining unit) obtains the information on the user of the wireless terminal 4 specified according to the detection information and/or the information on the installation location of the wireless LAN access point 2; the determination unit 37 (an example of a determination unit) determines either the wireless LAN access point 2 or the mobile phone base station 7 (an example of a wireless WAN base station), on the basis of information obtained by the obtaining unit 36, as a communication medium that notifies the notification information; and the transmission unit 38 (an example of a notification unit) notifies the notification information stored in the location information DB 34 (an example of an information storage unit) via the communication medium determined by the determination unit 37 to the wireless terminal 4 specified according to the detection information.

Such a configuration can notify notification information through the communication medium corresponding to the information on the user of the wireless terminal 4 and/or the information on the installation location of the wireless LAN access point 2 and thus can appropriately notify the information to the user.

Further, the obtaining unit 36 obtains the information indicating the moving state of the user of the wireless terminal 4 specified according to the detection information. The determination unit 37 determines the communication medium to notify the notification information on the basis of the moving state of the user obtained by the obtaining unit 36.

Such a configuration can determine either the wireless LAN access point 2 or the mobile phone base station 7, on the basis of the moving state of the wireless terminal 4, as the communication medium that notifies the notification information. This can appropriately notify the notification information to the wireless terminal 4. For example, when the notification information is notified from the wireless LAN access point 2 to a wireless terminal 4 just before the wireless terminal 4 exits an AP communication area, the wireless terminal 4 sometimes leaves out of the AP communication area. When the wireless terminal 4 moves as described above, notifying the notification information from the mobile phone base station 7 can surely notify the notification information.

Further, the reception unit 35 (an example of a terminal state detection unit) detects the period of stay and the radio wave intensity of the wireless terminal 4 at the wireless LAN access point 2. The obtaining unit 36 obtains the information indicating the moving state of the user of the wireless terminal 4 on the basis of the period of stay and the radio wave intensity detected with the reception unit 35.

Such a configuration can detect the moving state of the terminal user on the basis of the terminal information detected in the wireless LAN access point 2. This can appropriately determine the information on the movement of the wireless terminal 4 even when the wireless terminal 4 does not include a GPS.

Further, the obtaining unit 36 obtains the information indicating the attribute of the user of the wireless terminal 4 specified according to the detection information. The determination unit 37 determines, on the basis of the information indicating the attribute of the user obtained in the obtaining unit 36, the communication medium to notify the notification information.

Such configuration can determine either the wireless LAN access point 2 or the mobile phone base station 7, on the basis of the attribute of the user of the wireless terminal 4, as the communication medium that notifies the notification information. This can appropriately notify the notification information to the wireless terminal 4.

The obtaining unit 36 obtains the communication subscription condition of the wireless WAN communication set to the wireless terminal 4 and the used packet amount of the wireless terminal 4 as the information indicating the attribute of the user of the wireless terminal 4 specified according to the detection information. The determination unit 37 selects the wireless LAN access point 2 as the communication medium to notify the notification information when the used packet amount for the wireless WA communication by the wireless terminal 4 specified according to the detection information exceeds the threshold according to the communication subscription condition of the wireless LAN communication set to the wireless terminal 4.

Such configuration can avoid a situation, for example, in which a notification of the notification information causes the used packet amount to exceed the threshold specified in the communication subscription condition.

The determination unit 37 selects the wireless LAN access point 2 as the communication medium to notify the notification information in a case when the attribute of the user of the wireless terminal 4 specified according to the detection information includes the attribute indicating a party to the installation location of the wireless LAN access point 2, and selects the mobile phone base station 7 as the communication medium to notify the notification information in other cases.

Such a configuration can select the communication medium to notify the notification information according to whether the attribute indicates a party to the AP installation location (for example, the driver or the school official). This can select an appropriate communication medium for the AP installation location.

In a case when the wireless LAN access point 2 is installed in the car and the attribute of the user of the wireless terminal 4 specified according to the detection information includes the attribute indicating the driver of the car that is the installation location of the wireless LAN access point 2, the determination unit 37 selects the mobile phone base station 7 as the communication medium to notify the notification information, and selects the wireless LAN access point 2 as the communication medium to notify the notification information in other cases.

Such a configuration selects the mobile phone base station 7 as the communication medium for the user of the wireless terminal 4 who is set as the driver in the communication area of the car-mounted wireless LAN access point 2. Thus, for example, notifying the notification information having a small information amount to the user can curb the influence on the user.

The obtaining unit 36 further obtains the information on the installation location of the wireless LAN access point 2. The determination unit 37 determines the notification information from the communication medium to notify the notification information on the basis of the information on the installation location of the wireless LAN access point 2 in addition to the information on the user of the wireless terminal 4 specified according to the detection information.

Such a configuration determines the notification information from the communication medium to notify the notification information on the basis of the information on the installation location of the wireless LAN access point 2 in addition to the information on the user of the wireless terminal 4. This can select an appropriate communication medium for the AP installation location.

The obtaining unit 36 obtains the information on the installation location of the wireless LAN access point 2. The determination unit 37 determines the notification information from the communication medium to notify the notification information on the basis of the information on the installation location of the wireless LAN access point 2.

Such configuration can determine either the wireless LAN access point 2 or the mobile phone base station 7, on the basis of the installation location of the wireless LAN access point 2 as the communication medium that notifies the notification information. This can appropriately notify the notification information to the wireless terminal 4.

In a case when the obtaining unit 36 further obtains the information indicating the attribute of the user of the wireless terminal 4 specified according to the detection information; the wireless LAN access point 2 is installed a specific location; and the information on the user of the wireless terminal 4 specified according to the detection information is specific information, the determination unit 37 selects the wireless LAN access point 2 as the communication medium to notify the notification information, and selects the mobile phone base station 7 in other cases.

Such configuration can determine either the wireless LAN access point 2 or the mobile phone base station 7, on the basis of the information indicating the attribute of the user of the wireless terminal 4 and the installation location of the wireless LAN access point 2, as the communication medium that notifies the notification information. This can appropriately notify the notification information to the wireless terminal 4.

The information providing apparatus 3 can be implemented with a plurality of server computers. Some of the functions can be implemented by calling an external platform or the like, for example, using an application programming interface (API) or network computing. As described above, the configuration can flexibly be changed. Alternatively, a part of the functions of the information providing apparatus 3 can also be implemented in the wireless LAN access point 2.

The information providing system, information providing apparatus, and information providing method according to the present application exert an effect to appropriately notify information to the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information providing system comprising:
   a wireless Local Area Network (LAN) access point including a first processor; and
   an information providing apparatus including a second processor and a memory, the information providing apparatus being configured to manage information corresponding to the wireless LAN access point,
   wherein the first processer is programmed to perform a process comprising:
   (a) detecting a wireless terminal existing in a communication area of the wireless LAN access point; and
   (b) transmitting detection information including information on the wireless terminal detected in the (a) detecting step to the information providing apparatus, and
   the memory is configured to store notification information corresponding to the wireless LAN access point, the notification information including content related to a commercial space in which the wireless LAN access point is installed, and
   wherein the second processer is programmed to perform a process comprising:
   (c) receiving the detection information transmitted from the wireless LAN access point;
   (d) obtaining first moving state information and second moving state information, the first moving state information including information on a moving state of a user of the wireless terminal specified according to the detection information in the communication area of the wireless LAN access point, and the second moving state information including information on a moving state of the user of the wireless terminal specified according to the detection information between the communication area of the wireless LAN access point and a communication area of another wireless LAN access point, the second moving state information including an elapsed time after the user of the wireless terminal has transferred from the communication area of the other wireless LAN access point to the communication area of the wireless LAN access point;

(e) determining either the wireless LAN access point or a wireless Wide Area Network (WAN) base station, on the basis of the first moving state information and the second moving state information obtained in the (d) obtaining step, as a communication medium to provide the notification information; and (f) providing the notification information stored in the memory from the communication medium determined in (e) determining step to the wireless terminal specified according to the detection information, wherein:

the (e) determining step includes:

(h) determining whether the wireless LAN access point and the other wireless LAN access point are set in a same group as each other; and (i) determining either the wireless LAN access point or the wireless WAN base station on the basis of the first moving state information and the second moving state information obtained in the (d) obtaining step and a determination result of the (h) determining step, as the communication medium to provide the notification information.

2. The information providing system according to claim 1, wherein at least one of the first and second processors is programmed to perform the process further comprising:

(g) detecting a period of stay and a radio wave intensity of the wireless terminal at the wireless LAN access point, and in the (d) obtaining step, the information indicating the moving state of the user is obtained based on the period of stay and the radio wave intensity detected in the (g) detecting step.

3. The information providing system according to claim 1, wherein in the (d) obtaining step, information indicating an attribute of the user of the wireless terminal specified according to the detection information is obtained, and (e) determining step includes determining either the wireless LAN access point or the wireless WAN base station, on the basis of the information indicating the attribute of the user, as the communication medium to notify the notification information.

4. The information providing system according to claim 3, wherein the (e) determining step includes selecting the wireless LAN access point as the communication medium to notify the notification information in a case when the attribute of the user of the wireless terminal specified according to the detection information includes an attribute indicating a party to the installation location of the wireless LAN access point, and selecting the wireless WAN base station as the communication medium to notify the notification information in other cases.

5. The information providing system according to claim 3, wherein the installation location of the wireless LAN access point is in a car, and the (e) determining step includes selecting the wireless WAN base station as the communication medium to notify the notification information in a case when the attribute of the user of the wireless terminal specified according to the detection information includes an attribute indicating a driver of the car that is the installation location of the wireless LAN access point, and selecting the wireless LAN access point as the communication medium to notify the notification information in other cases.

6. The information providing system according to claim 3, wherein the (d) obtaining step includes obtaining a communication subscription condition of a wireless WAN communication set to the wireless terminal and a used packet amount of the wireless terminal as the information indicating the attribute of the user of the wireless terminal specified according to the detection information, and the (e) determining step includes selecting the wireless LAN access point as the communication medium to notify the notification information in a case when the used packet amount of the wireless WAN communication by the wireless terminal specified according to the detection information exceeds a threshold according to the communication subscription condition of the wireless WAN communication set to the wireless terminal.

7. The information providing system according to claim 3, wherein the attribute of the user of the wireless terminal includes a behavior history of the user in an installation location of the wireless LAN access point, and the (e) determining step includes selecting the wireless LAN access point as the communication medium in a case when a point based on the behavior history is equal to or higher than a predetermined threshold, and selecting the wireless WAN base station as the communication medium in a case when the point is lower than the predetermined threshold.

8. The information providing system according to claim 7, wherein the behavior history includes at least one of a purchase history of products, a visiting number, and a visiting frequency in the installation location of the wireless LAN access point.

9. The information providing system according to claim 1, wherein the (d) obtaining step further includes obtaining information on the installation location of the wireless LAN access point, and (e) determining step includes selecting either the wireless LAN access point or the wireless WAN base station, on the basis of the information on the installation location of the wireless LAN access point in addition to the information on the user of the wireless terminal specified according to the detection information, as the communication medium to notify the notification information.

10. The information providing system according to claim 1, wherein in the (d) obtaining step, information on the installation location of the wireless LAN access point is obtained, and (e) determining step includes selecting either the wireless LAN access point or the wireless WAN base station, on the basis of the information on the installation location of the wireless LAN access point, as the communication medium to notify the notification information.

11. The information providing system according to claim 10, wherein
the (d) obtaining step further includes obtaining the information indicating the attribute of the user of the wireless terminal specified according to the detection information, and
(e) determining step includes selecting the wireless LAN access point as the communication medium to notify the notification information in a case when the wireless LAN access point is installed at a specific location, and when the information on the user of the wireless terminal specified according to the detection information is specific information, and selects the wireless WAN base station in other cases.

12. An information providing apparatus comprising:
a memory configured to store notification information according to a wireless communication unit, the notification information including content related to a commercial space in which a wireless Local Area Network (LAN) access point is installed; and
a processor programmed to perform a process including:
(a) obtaining detection information including information on a wireless terminal existing in a communication area of the wireless communication unit from the wireless communication unit;
(b) obtaining first moving state information and second moving state information, the first moving state information including information on a moving state of a user of the wireless terminal specified according to the detection information in the communication area of the wireless communication unit, and the second moving state information including information on a moving state of the user of the wireless terminal between the communication area of the wireless communication unit and a communication area of another wireless communication unit, the second moving state information including an elapsed time after the user of the wireless terminal has transferred from the communication area of the other wireless LAN access point to the communication area of the wireless LAN access point;
(c) determining either the wireless communication unit or a wireless Wide Area Network (WAN) base station, on the basis of the first moving state information and the second moving state information obtained in the (a) obtaining step, as a communication medium to provide the notification information; and
(d) providing the notification information stored in the memory from the communication medium determined in (c) determining step to the wireless terminal specified according to the detection information, wherein:
the (c) determining step includes:
determining either the wireless LAN access point or the wireless WAN base station on the basis of the first moving state information and the second moving state information obtained in the obtaining step and a result of determining whether the wireless LAN access point and the other wireless LAN access point are set in a same group as each other, as the communication medium to provide the notification information.

13. An information providing method comprising:
detecting, by a wireless Local Area Network (LAN) access point, a wireless terminal existing in a communication area of the wireless LAN access point;
transmitting, by the wireless LAN access point, detection information including information on the wireless terminal detected in the detecting to an information providing apparatus;
receiving, by the information providing apparatus, the detection information transmitted from the wireless LAN access point;
obtaining, by the information providing apparatus, first moving state information and second moving state information, the first moving state information including information on a moving state of a user of the wireless terminal specified according to the detection information in the communication area of the wireless LAN access point, and the second moving state information including information on a moving state of the user of the wireless terminal between the communication area of the wireless LAN access point and a communication area of another wireless LAN access point, the second moving state information including an elapsed time after the user of the wireless terminal has transferred from the communication area of the other wireless LAN access point to the communication area of the wireless LAN access point;
determining, by the information providing apparatus, either the wireless LAN access point or a wireless Wide Area Network (WAN) base station, on the basis of the first moving state information and the second moving state information obtained in the obtaining step, as a communication medium to provide a notification information stored in a memory, the notification information including content related to a commercial space in which the wireless LAN access point is installed; and
providing, by the information providing apparatus, the notification information stored in the memory from the communication medium determined in the determining step to the wireless terminal specified according to the detection information, wherein:
the determining step includes:
determining either the wireless LAN access point or the wireless WAN base station on the basis of the first moving state information and the second moving state information obtained in the obtaining step and a result of determining whether the wireless LAN access point and the other wireless LAN access point are set in a same group as each other, as the communication medium to provide the notification information.

* * * * *